United States Patent [19]

Yamada et al.

[11] Patent Number: 5,942,862

[45] Date of Patent: *Aug. 24, 1999

[54] POWER OUTPUT APPARATUS AND METHOD OF CONTROLLING THE SAME

[75] Inventors: Eiji Yamada, Owariasahi; Takao Miyatani, Toyota; Yasutomo Kawabata, Aichi-ken, all of Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/636,306

[22] Filed: Apr. 23, 1996

[30] Foreign Application Priority Data

| May 19, 1995 | [JP] | Japan | 7-145575 |
| Sep. 22, 1995 | [JP] | Japan | 7-269241 |

[51] Int. Cl.⁶ .................................................. H02K 7/10
[52] U.S. Cl. ............................ 318/9; 318/87; 318/98; 318/376; 180/65.3; 701/67; 477/5
[58] Field of Search .................................. 180/65.1, 65.2, 180/65.3, 270; 364/424.1, 424.026, 426, 431; 477/5, 7, 15, 20, 30; 475/26, 107, 113, 104, 91; 74/730.1, 845, 61, 665 A; 318/9, 11, 376, 366, 374, 381, 49, 76, 79, 78, 87

[56] References Cited

U.S. PATENT DOCUMENTS

| 1,491,492 | 4/1924 | Owen . |
| 3,683,249 | 8/1972 | Shibata . |
| 3,699,351 | 10/1972 | Addie . |
| 3,789,281 | 1/1974 | Shibata . |
| 4,282,947 | 8/1981 | Kemper . |

FOREIGN PATENT DOCUMENTS

| 0 510 582 A2 | 10/1992 | European Pat. Off. . |
| 0 725 474 | 8/1996 | European Pat. Off. . |
| 30 09 503 | 9/1981 | Germany . |
| 49-43311 | 4/1974 | Japan . |
| 53-133814 | 11/1978 | Japan . |
| 55-103100 | 8/1980 | Japan . |
| WO 89/04081 | 5/1989 | WIPO . |

*Primary Examiner*—Brian Sircus
*Attorney, Agent, or Firm*—Oliff & Berridge PLC

[57] ABSTRACT

A power output apparatus (20) of the present invention includes a clutch motor (30), an assist motor (40), an engine (50), and a controller (80) for controlling the clutch motor (30) and the assist motor (40). Auxiliary machinery driven by the rotation of a crankshaft (56), such as a cooling pump (104) and a P/S pump (106), are connected directly or via a belt (102) to a crankshaft (56B) of the engine (50). When the assist motor (40) rotates a drive shaft (22) only with electric power stored in a battery (94) under the non-operating condition of the engine (50), the clutch motor (30) applies a torque of rotational motion TST to the crankshaft (56) to rotate the crankshaft (56) at a predetermined revolving speed. This structure allows the crankshaft (56) to be rotated even when the engine (50) is at a stop, thereby supplying the required power to drive the auxiliary machinery.

12 Claims, 14 Drawing Sheets

POWER OUTPUT APPARATUS AND METHOD OF CONTROLLING THE SAME

BACKGROUND OF THE INVENTION

1. Field of the Invention

The present invention generally relates to a power output apparatus and a method of controlling the same. More specifically, the invention pertains to a power output apparatus for transmitting or utilizing power output from an engine at a high efficiency and a method of controlling such a power output apparatus.

2. Description of the Related Art

In proposed power output apparatuses mounted on a vehicle, an output shaft of an engine is electromagnetically connected to a drive shaft linked with a rotor of a motor via an electromagnetic coupling, so that power of the engine is transmitted to the drive shaft (as disclosed in, for examples JAPANESE PATENT LAYING-OPEN GAZETTE No. 53-133814). When the revolving speed of the motors which starts driving the vehicle, reaches a predetermined levels the proposed power output apparatus supplies an exciting current to the electromagnetic coupling in order to crank the engine, and subsequently carries out fuel injection into the engine as well as spark ignitions thereby starting the engine and enabling the engine to supply power. When the vehicle speed is lowered and the revolving speed of the motor decreases to or below the predetermined levels on the other hand, the power output apparatus stops the supply of exciting current to the electromagnetic coupling as well as fuel injection into the engine and spark ignition, thereby terminating operation of the engine.

In the vehicle with such a power output apparatus incorporated therein, power required to drive auxiliary machinery is obtained through the rotation of the output shaft of the engine or compensated with the electric power stored in a battery. The auxiliary machinery includes auxiliary machines required for the operation of the power output apparatus, for example, a pump for circulating the cooling water of the engine, and those required not for the operation of the power output apparatus but for the operation of the vehicle, such as a pump for a power steering and a pump for an air conditioner. In the system of supplying the power of the auxiliary machinery from the battery, the battery is required to have a large capacity and thereby a large size to supply sufficient electric power to the auxiliary machinery. The battery is generally charged with the regenerative electric power corresponding to the slip of the electromagnetic coupling. The total energy efficiency is thus lowered depending upon the operation efficiency of the electromagnetic coupling and the charging efficiency and discharging efficiency of the battery.

In the system that the auxiliary machinery is mechanically linked with the output shaft of the engine, mechanical energy produced by the rotation of the output shaft is directly supplied as the power of the auxiliary machinery. This structure does not cause the problem as discussed above. In this structure, however, the output shaft of the engine does not rotate when the engine stops its operation and the vehicle is driven only with the electric power stored in the battery. The standing output shaft does not produce the power required for the operation of the auxiliary machinery.

SUMMARY OF THE INVENTION

The object of the present invention, which overcomes the drawbacks of the prior art structures, is thus to transmit or utilize power generated by an engine at a high efficiency and enable sufficient power to be supplied to auxiliary machinery connecting with an output shaft of the engine even when the engine stops its operation and the vehicle is driven only with electric power stored in a battery.

The above and the other related objects of the present invention are realized at least partly by a first power output apparatus for outputting power to a drive shaft. The first power output apparatus comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a first motor-driving circuit for controlling a degree of electromagnetic connection of the first rotor and the second rotor in the first motor and regulating the rotation of the second rotor relative to the first rotor; a second motor connected with the drive shaft; a second motor-driving circuit for driving and controlling the second motor; a storage battery being charged with electric power regenerated by the first motor via the first motor-driving circuit, being charged with electric power regenerated by the second motor via the second motor-driving circuit, discharging electric power required to drive the first motor via the first motor-driving circuit, and discharging electric power required to drive the second motor via the second motor-driving circuit; auxiliary machinery connected with the output shaft of the engine and driven by the power of the output shaft; and auxiliary machinery control means for controlling the first motor-driving circuit to enable the first motor to apply a torque to the output shaft of the engine with the electric power stored in the storage battery while the engine stops its operation, the torque allowing the output shaft of the engine to rotate at a predetermined revolving speed.

Even when the engine stops its operation, the first power output apparatus of the invention can drive the first motor with the electric power stored in the storage battery so as to rotate the output shaft of the engine and thereby drive the auxiliary machinery connecting with the output shaft of the engine.

In accordance with one aspect of the first power output apparatus, the torque is a first torque; and the auxiliary machinery control means comprises means for controlling the second motor-driving circuit to enable the second motor to apply a second torque to the drive shaft, in order to reduce a variation in torque of the drive shaft due to the rotation of the output shaft of the engine at the predetermined revolving speed.

In accordance with another aspect of the first power output apparatus, the auxiliary machinery control means comprises means for controlling the second motor-driving circuit to enable the second motor to apply the second torque to the drive shaft as a sum of a third torque and a fourth torque, the third torque being applied to rotate the drive shaft and the fourth torque having a magnitude substantially equal to the first torque applied by the first motor to rotate the output shaft of the engine at the predetermined revolving speed but being opposite in direction to the first torque.

The invention is also directed to a second power output apparatus for outputting power to a drive shaft. The second power output apparatus comprises: an engine having an output shaft; a complex motor comprising a first rotor connected with the output shaft of the engine, a second rotor connected with the drive shaft being coaxial to and rotatable relative to the first rotor, and a stator for rotating the second rotor, the first rotor and the second rotor constituting a first motor, the second rotor and the stator constituting a second motor; a first motor-driving circuit for driving and controlling the first motor in the complex motor; a second motor-driving circuit for driving and controlling the second motor in the complex motor; a storage battery being charged with electric power regenerated by the first motor via the first motor-driving circuit, being charged with electric power regenerated by the second motor via the second motor-driving circuit, discharging electric power required to drive the first motor via the first motor-driving circuit, and discharging electric power required to drive the second motor via the second motor-driving circuit; auxiliary machinery connected with the output shaft of the engine and driven by the power of the output shaft; and auxiliary machinery control means for controlling the first motor-driving circuit to enable the first motor in the complex motor to apply a torque to the output shaft of the engine with the electric power stored in the storage battery while the engine stops its operation, the torque allowing the output shaft of the engine to rotate at a predetermined revolving speed.

Even when the engine stops its operation the second power output apparatus of the invention can drive the first motor in the complex motor with the electric power stored in the storage battery so as to rotate the output shaft of the engine and thereby drive the auxiliary machinery connecting with the output shaft of the engine. In the structure of the second power output apparatus, the first motor is integrally joined with the second motor. This reduces the weight and size of the whole power output apparatus.

In accordance with one aspect of the second power output apparatus, the torque is a first torque; and the auxiliary machinery control means comprises means for controlling the second motor-driving circuit to enable the second motor in the complex motor to apply a second torque to the drive shaft, in order to reduce a variation in torque of the drive shaft due to the rotation of the output shaft of the engine at the predetermined revolving speed.

In accordance with one aspect of the second power output apparatus, the auxiliary machinery control means controls the second motor-driving circuit to enable the second motor in the complex motor to apply the second torque to the drive shaft as a sum of a third torque and a fourth torque, the third torque being applied to rotate the drive shaft and the fourth torque having a magnitude substantially equal to the first torque applied by the first motor in the complex motor to rotate the output shaft of the engine at the predetermined revolving speed but being opposite in direction to the first torque.

In accordance with another aspect of the invention, a third power output apparatus for outputting power to a drive shaft comprises: an engine having an output shaft; a first motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a first motor-driving circuit for controlling a degree of electromagnetic connection of the first rotor with the second rotor in the first motor and regulating the rotation of the second rotor relative to the first rotor; a second motor comprising a third rotor connected with the output shaft of the engine; a second motor-driving circuit for driving and controlling the second motor; a storage battery being charged with electric power regenerated by the first motor via the first motor-driving circuit, being charged with electric power regenerated by the second motor via the second motor-driving circuit, discharging electric power required to drive the first motor via the first motor-driving circuit, and discharging electric power required to drive the second motor via the second motor-driving circuit; auxiliary machinery connected with the output shaft of the engine and driven by the power of the output shaft; and auxiliary machinery control means for controlling the second motor-driving circuit to enable the second motor to apply a torque to the output shaft of the engine with the electric power stored in the storage battery while the engine stops its operation, the torque allowing the output shaft of the engine to rotate at a predetermined revolving speed.

Even when the engine stops its operation, the third power output apparatus of the invention can drive the second motor with the electric power stored in the storage battery so as to rotate the output shaft of the engine and thereby drive the auxiliary machinery connecting with the output shaft of the engine.

In accordance with one aspect of the third power output apparatus, the torque is a first torque, and the auxiliary machinery control means controls the second motor-driving circuit to enable the second motor to apply to the output shaft of the engine the first torque, which is greater than a second torque applied from the first motor to the drive shaft.

In accordance with still another aspect of the invention, a fourth power output apparatus for outputting power to a drive shaft comprises: an engine having an output shaft; a complex motor comprising a first rotor connected with the output shaft of the engine, a second rotor connected with the drive shaft being coaxial to and rotatable relative to the first rotor, and a stator for rotating the first rotor, the first rotor and the second rotor constituting a first motor, the first rotor and the stator constituting a second motor; a first motor-driving circuit for driving and controlling the first motor in the complex motor; a second motor-driving circuit for driving and controlling the second motor in the complex motor; a storage battery being charged with electric power regenerated by the first motor via the first motor-driving circuit, being charged with electric power regenerated by the second motor via the second motor-driving circuit, discharging electric power required to drive the first motor via the first motor-driving circuit, and discharging electric power required to drive the second motor via the second motor-driving circuit; auxiliary machinery connected with the output shaft of the engine and driven by the power of the output shaft; and auxiliary machinery control means for controlling the second motor-driving circuit to enable the second motor in the complex motor to apply a torque to the output shaft of the engine with the electric power stored in the storage battery while the engine stops its operation, the torque allowing the output shaft of the engine to rotate at a predetermined revolving speed.

Even when the engine stops its operation, the fourth power output apparatus of the invention can drive the second motor in the complex motor with the electric power stored in the storage battery so as to rotate the output shaft of the engine and thereby drive the auxiliary machinery connecting with the output shaft of the engine. In the structure of the fourth power output apparatus, the first motor is integrally joined with the second motor. This reduces the weight and size of the whole power output apparatus.

In accordance with one aspect of the fourth power output apparatus, the torque is a first torque, and the auxiliary machinery control means comprises means for controlling the second motor-driving circuit to enable the second motor in the complex motor to apply to the output shaft of the engine the first torque, which is greater than a second torque applied from the first motor in the complex motor to the drive shaft.

The above and the other objects of the present invention are also realized at least partly by a first method of controlling a power output apparatus for outputting power to a drive shaft. The first method comprises the steps of: (a) providing an engine having an output shafts a first motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a second motor connected with the drive shaft; a storage battery being charged with electric power regenerated by the first motor, being charged with electric power regenerated by the second motor, discharging electric power required to drive the first motor, and discharging electric power required to drive the second motor; and auxiliary machinery connected with the output shaft of the engine and driven by the power of the output shaft; and (b) controlling the first motor to enable the first motor to apply a torque to the output shaft of the engine with the electric power stored in the storage battery while the engine stops its operation, the torque allowing the output shaft of the engine to rotate at a predetermined revolving speed.

Even when the engine stops its operation, the first method of the invention can drive the first motor with the electric power stored in the storage battery so as to rotate the output shaft of the engine and thereby drive the auxiliary machinery connecting with the output shaft of the engine.

In accordance with one aspect of the first method, the torque is a first torque; and the first method further comprises the step of (c) controlling the second motor to enable the second motor to apply a second torque to the drive shaft as a sum of a third torque and a fourth torque, the third torque being applied to rotate the drive shaft and the fourth torque having a magnitude substantially equal to the first torque applied by the first motor to rotate the output shaft of the engine at the predetermined revolving speed but being opposite in direction to the first torque.

The present invention is further directed to a second method of controlling a power output apparatus for outputting power to a drive shaft. The second method comprises the steps of: (a) providing an engine having an output shaft; a first motor comprising a first rotor connected with the output shaft of the engine and a second rotor connected with the drive shaft, the second rotor being coaxial to and rotatable relative to the first rotor, the first and second rotors being electromagnetically connected with each other, whereby power is transmitted between the output shaft of the engine and the drive shaft via the electromagnetic connection of the first and second rotors; a second motor connected with the output shaft of the engine; a storage battery being charged with electric power regenerated by the first motor, being charged with electric power regenerated by the second motor, discharging electric power required to drive the first motor, and discharging electric power required to drive the second motor; and auxiliary machinery connected with the output shaft of the engine and driven by the power of the output shaft; and (b) controlling the second motor to enable the second motor to apply a torque to the output shaft of the engine with the electric power stored in the storage battery while the engine stops its operation, the torque allowing the output shaft of the engine to rotate at a predetermined revolving speed.

Even when the engine stops its operation, the second method of the invention can drive the second motor with the electric power stored in the storage battery so as to rotate the output shaft of the engine and thereby drive the auxiliary machinery connecting with the output shaft of the engine.

In accordance with one aspect of the second method, the torque is a first torque; and the second method further comprises the step of (c) controlling the second motor-driving circuit to enable the second motor to apply to the output shaft of the engine the first torque, which is greater than a second torque applied from the first motor to the drive shaft.

These and other objects, features aspects, and advantages of the present invention will become more apparent from the following detailed description of the preferred embodiments with the accompanying drawings.

DETAILED DESCRIPTION OF PREFERRED EMBODIMENTS

Figure 1:
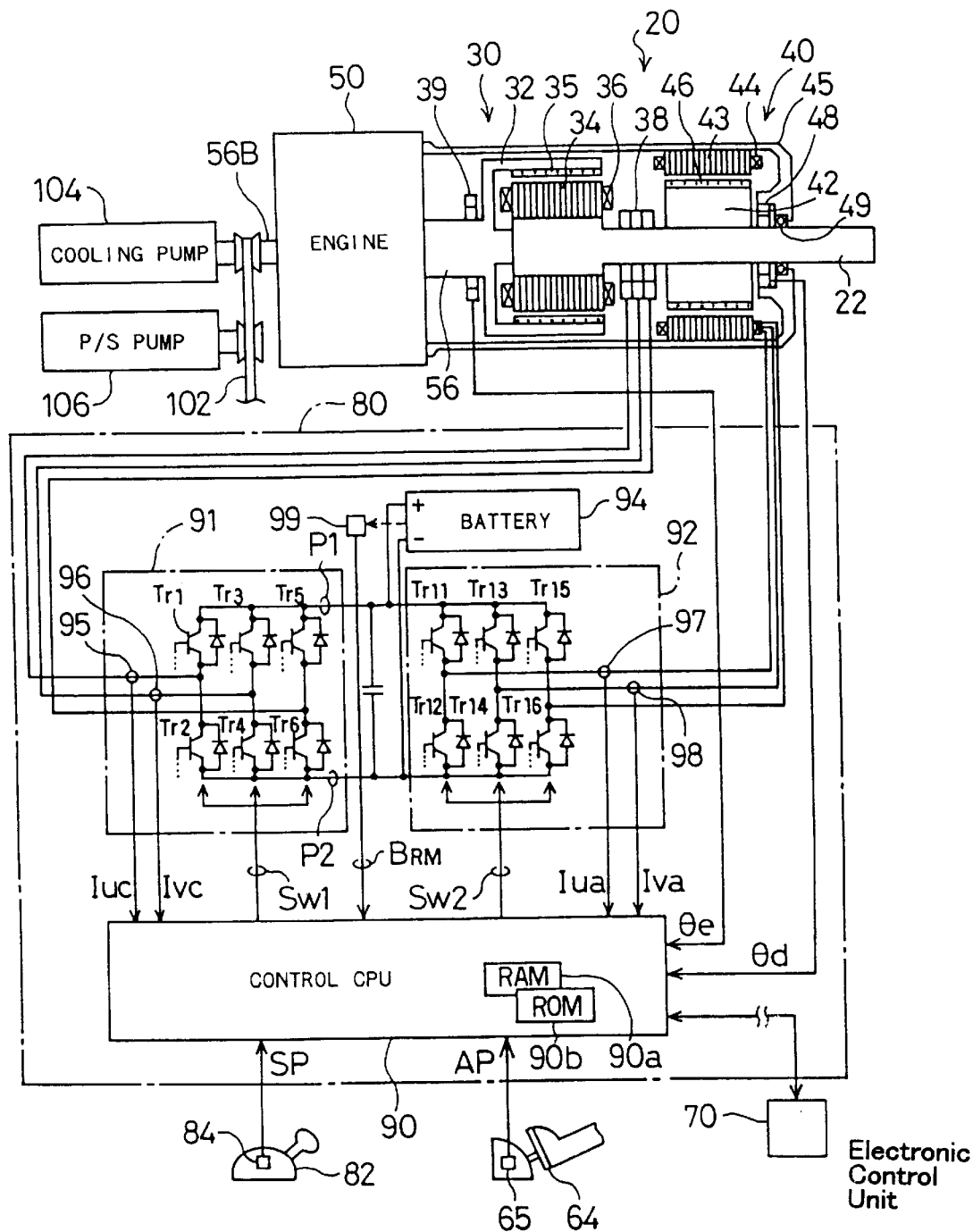
FIG. 1 schematically illustrates structure of a power output apparatus 20 as a first embodiment according to the present invention.
Figure 2:
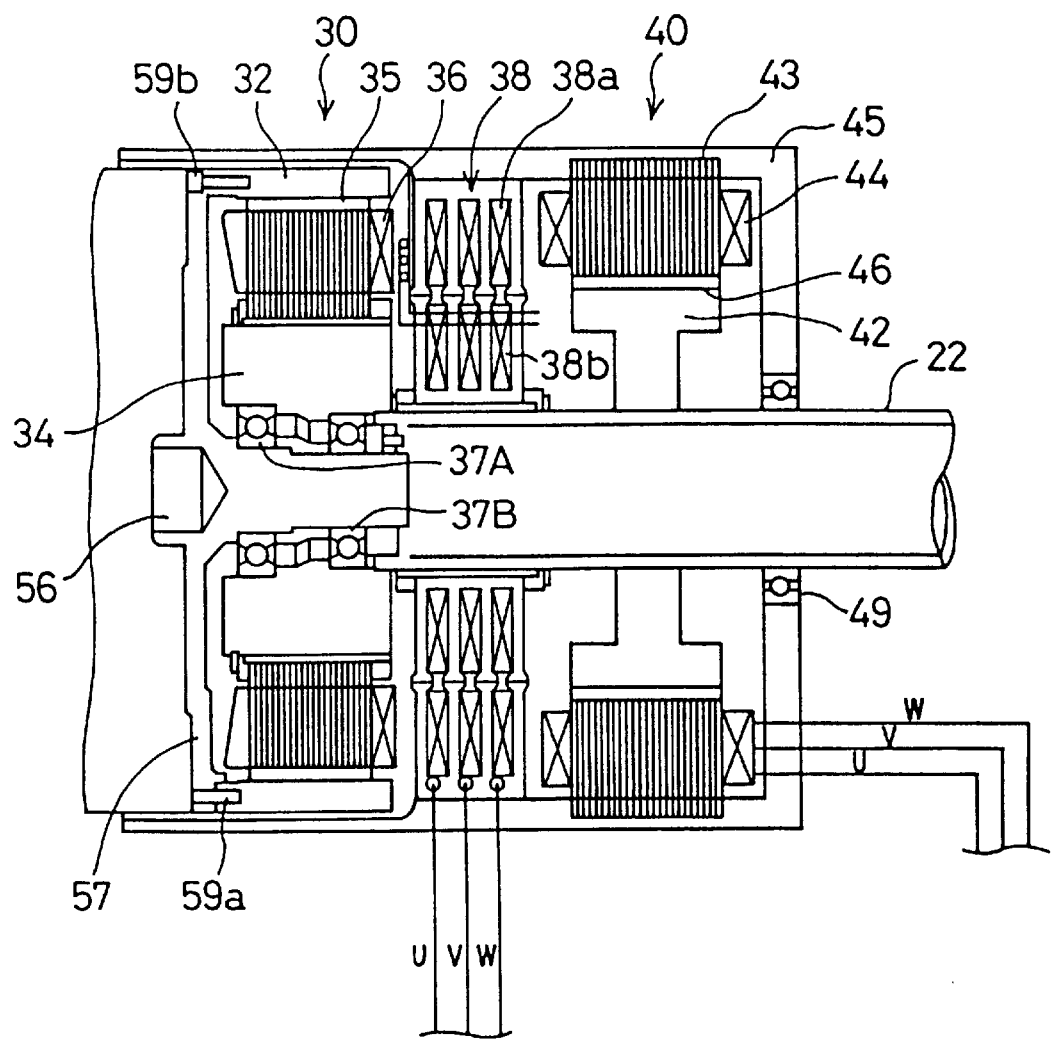
FIG. 2 is a cross sectional view illustrating detailed structures of a clutch motor 30 and an assist motor 40 included in the power output apparatus 20 of FIG. 1.
Figure 3:
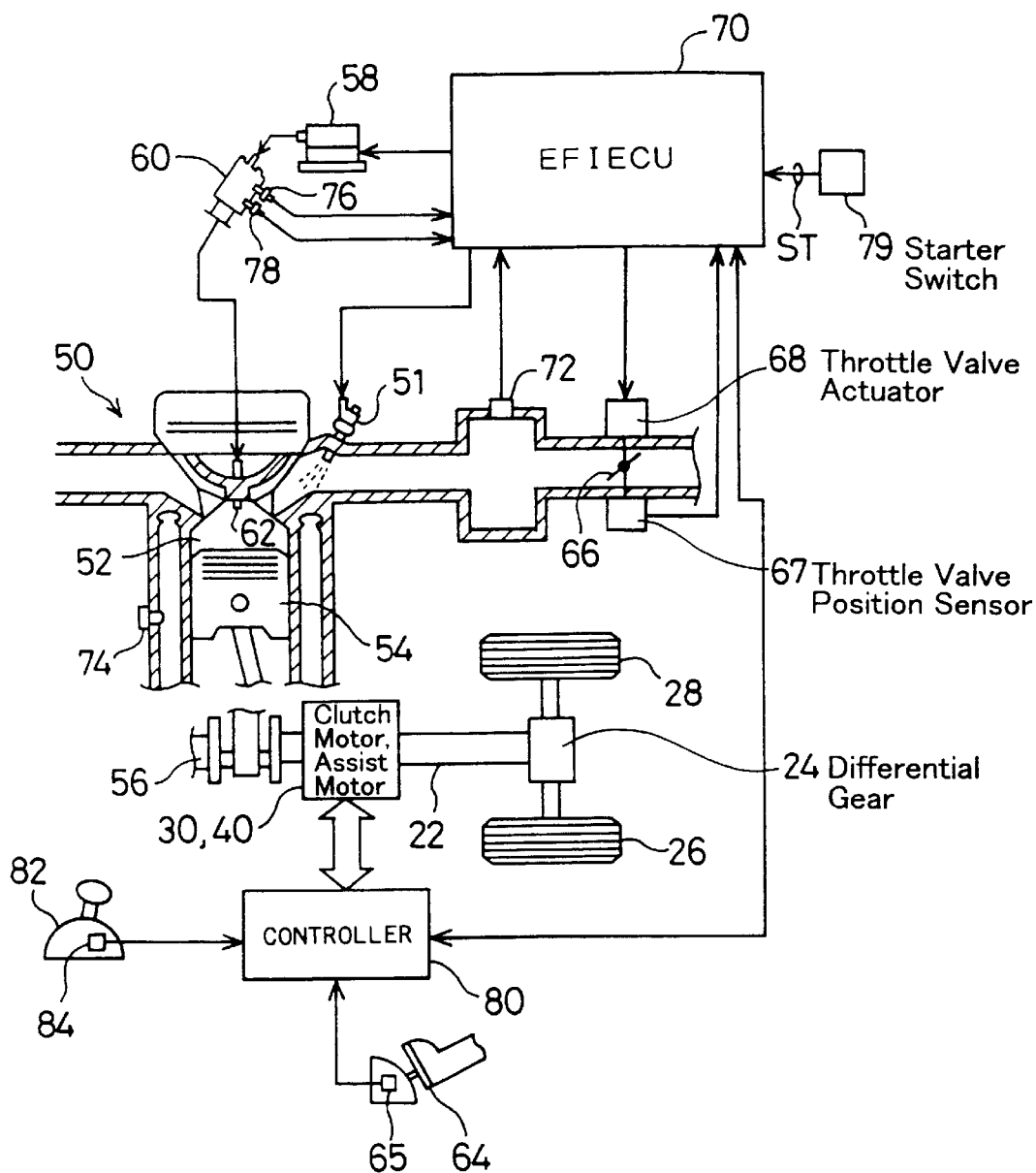
FIG. 3 is a schematic view illustrating general structure of a vehicle with the power output apparatus 20 of FIG. 1 incorporated therein.

FIG. 1 is a schematic view illustrating structure of a power output apparatus 20 as a first embodiment according to the present invention; FIG. 2 is a cross sectional view illustrating detailed structures of a clutch motor 30 and an assist motor 40 included in the power output apparatus 20 of FIG. 1; and FIG. 3 is a schematic view illustrating a general structure of a vehicle with the power output apparatus 20 of FIG. 1 incorporated therein. The general structure of the vehicle is described first as a matter of convenience.

Referring to FIG. 3, the vehicle is provided with an engine 50 driven by gasoline as a power source. The air ingested from an air supply system via a throttle valve 66 is mixed with fuel, that is, gasoline in this embodiment, injected from a fuel injection valve 51. The air/fuel mixture is supplied into a combustion chamber 52 to be explosively ignited and burned. Linear motion of a piston 54 pressed down by the explosion of the air/fuel mixture is converted to rotational motion of a crankshaft 56. The throttle valve 66 is driven to open and close by an actuator 68. An ignition plug 62 converts a high voltage applied from an igniter 58 via a distributor 60 to a spark which explosively ignites and combusts the air/fuel mixture.

Operation of the engine 50 is controlled by an electronic control unit (hereinafter referred to as EFIECU) 70. The EFIECU 70 receives information from various sensors, which detect operating conditions of the engine 50. These sensors include a throttle valve position sensor 67 for detecting the position of the throttle valve 66, a manifold vacuum sensor 72 for measuring a load applied to the engine 50, a water temperature sensor 74 for measuring the temperature of cooling water in the engine 50, and a speed sensor 76 and an angle sensor 78 mounted on the distributor 60 for measuring the revolving speed and rotational angle of the crankshaft 56. A starter switch 79 for detecting a starting condition ST of an ignition key (not shown) is also connected to the EFIECU 70. Other sensors and switches connecting with the EFIECU 70 are omitted from the drawings.

The crankshaft 56 of the engine 50 is linked with a drive shaft 22 via a clutch motor 30 and an assist motor 40 (described later in detail). The drive shaft 22 further connects with a differential gear 24, which eventually transmits the torque output from the drive shaft 22 of the power output apparatus 20 to left and right driving wheels 26 and 28. The clutch motor 30 and the assist motor 40 are driven and controlled by a controller 80. The controller 80 includes an internal control CPU and receives inputs from a gearshift position sensor 84 attached to a gearshift 82 and an accelerator position sensor 65 attached to an accelerator pedal 64, as described later in detail. The controller 80 sends and receives a variety of data and information to and from the EFIECU 70 through communication. Details of the control procedure including a communication protocol will be described later.

Some auxiliary machines are connected directly or via a belt 102 to a crankshaft 56B, which is projected from the engine 50 opposite in direction to the crankshaft 56. The auxiliary machines include a cooling pump 104 for circulating cooling water for the engine 50 and a P/S pump 106 for supplying power to a power steering. These auxiliary machines receive power produced through the rotation of the crankshaft 56B.

Referring to FIG. 1, the power output apparatus 20 essentially includes the engine 50 the clutch motor 30 with an outer rotor 32 and an inner rotor 34, the assist motor 40 with a rotor 42 and the controller 80 for driving and controlling the clutch motor 30 and the assist motor 40. The outer rotor 32 of the clutch motor 30 is mechanically connected to one end of the crankshaft 56 of the engine 50 whereas the inner rotor 34 thereof is mechanically linked with the rotor 42 of the assist motor 40.

As shown in FIG. 1, the clutch motor 30 is constructed as a synchronous motor having permanent magnets 35 attached to an inner surface of the outer rotor 32 and three-phase coils 36 wound on slots formed in the inner rotor 34. Power is supplied to the three-phase coils 36 via a rotary transformer 38. A thin laminated sheet of non-directional electromagnetic steel is used to form teeth and slots for the three-phase coils 36 in the inner rotor 34. A resolver 39 for measuring a rotational angle θe of the crankshaft 56 is attached on the crankshaft 56. The resolver 39 may also serve as the angle sensor 78 mounted on the distributor 60.

The assist motor 40 is also constructed as a synchronous motor having three-phase coils 44, which are wound on a stator 43 fixed to a casing 45 to generate a rotating magnetic field. The stator 43 is also made of a thin laminated sheet of non-directional electromagnetic steel. A plurality of permanent magnets 46 are attached to an outer surface of the rotor 42. In the assist motor 40, interaction between a magnetic field formed by the permanent magnets 46 and a rotating magnetic field formed by the three-phase coils 44 leads to rotation of the rotor 42. The rotor 42 is mechanically linked with the drive shaft 22 working as the torque output shaft of the power output apparatus 20. A resolver 48 for measuring a rotational angle θd of the drive shaft 22 is attached to the drive shaft 22, which is further supported by a bearing 49 held in the casing 45.

The inner rotor 34 of the clutch motor 30 is mechanically linked with the rotor 42 of the assist motor 40 and further with the drive shaft 22. When the rotation and axial torque of the crankshaft 56 of the engine 50 are transmitted via the outer rotor 32 to the inner rotor 34 of the clutch motor 30, the rotation and torque by the assist motor 40 are added to or subtracted from the transmitted rotation and torque.

While the assist motor 40 is constructed as a conventional permanent magnet-type three-phase synchronous motor, the clutch motor 30 includes two rotating elements or rotors, that is, the outer rotor 32 with the permanent magnets 35 and the inner rotor 34 with the three-phase coils 36. The detailed structure of the clutch motor 30 is described with the cross sectional view of FIG. 2. The outer rotor 32 of the clutch motor 30 is attached to a circumferential end of a wheel 57 set around the crankshaft 56, by means of a pressure pin 59a and a screw 59b. A central portion of the wheel 57 is protruded to form a shaft-like elements to which the inner rotor 34 is rotatably attached by means of bearings 37A and 37B. One end of the drive shaft 22 is fixed to the inner rotor 34.

A plurality of permanent magnets 35, four in this embodiment, are attached to the inner surface of the outer rotor 32 as mentioned previously. The permanent magnets 35 are magnetized in the direction towards the axial center of the clutch motor 30, and have magnetic poles of alternately inverted directions. The three-phase coils 36 of the inner rotor 34 facing to the permanent magnets 35 across a little gap are wound on a total of 24 slots (not shown) formed in the inner rotor 34. Supply of electricity to the respective coils forms magnetic fluxes running through the teeth (not shown), which separate the slots from one another. Supply of a three-phase alternating current to the respective coils rotates this magnetic field. The three-phase coils 36 are connected to receive electric power supplied from the rotary transformer 38. The rotary transformer 38 includes primary windings 38a fixed to the casing 45 and secondary windings 38b attached to the drive shaft 22 coupled with the inner rotor 34. Electromagnetic induction allows electric power to be transmitted from the primary windings 38a to the secondary windings 38b or vice versa. The rotary transformer 38 has windings for three phases, that is, U, V, and W phases, to enable the transmission of three-phase electric currents.

Interaction between a magnetic field formed by one adjacent pair of permanent magnets 35 and a rotating magnetic field formed by the three-phase coils 36 of the inner rotor 34 leads to a variety of behaviors of the outer rotor 32 and the inner rotor 34. The frequency of the three-phase alternating current supplied to the three-phase coils 36 is generally equal to a difference between the revolving speed (revolutions per second) of the outer rotor 32 directly connected to the crankshaft 56 and the revolving speed of the inner rotor 34. This results in a slip between the rotations of the outer rotor 32 and the inner rotor 34. Details of the control procedures of the clutch motor 30 and the assist motor 40 will be described later based on the flowcharts.

As mentioned above, the clutch motor 30 and the assist motor 40 are driven and controlled by the controller 80. Referring back to FIG. 1, the controller 80 includes a first driving circuit 91 for driving the clutch motor 30, a second driving circuit 92 for driving the assist motor 40, a control CPU 90 for controlling both the first and second driving circuits 91 and 92, and a battery 94 including a number of secondary cells. The control CPU 90 is a one-chip microprocessor including a RAM 90a used as a working memory, a RON 90b in which various control programs are stored, an input/output port (not shown), and a serial communication port (not shown) through which data are sent to and received from the EFIECU 70. The control CPU 90 receives a variety of data through the input/output port. The input data include a rotational angle θe of the crankshaft 56 of the engine 50 from the resolver 39, a rotational angle θd of the drive shaft 22 from the resolver 48, an accelerator pedal position AP (pressing amount of the accelerator pedal 64) from the accelerator position sensor 65, a gearshift position SP from the gearshift position sensor 84, clutch motor currents Iuc and Ivc from two ammeters 95 and 96 in the first driving circuit 91, assist motor currents Iua and Iva from two ammeters 97 and 98 in the second driving circuit 92, and a residual capacity BRM of the battery 94 from a residual capacity meter 99. The residual capacity meter 99 may determine the residual capacity BRN of the battery 94 by any known methods for example, by measuring the specific gravity of an electrolytic solution in the battery 94 or the whole weight of the battery 94, by computing the currents and time of charge and discharge, or by causing an instantaneous short-circuit between terminals of the battery 94 and measuring an internal resistance against the electric current.

The control CPU 90 outputs a first control signal SW1 for driving six transistors Tr1 through Tr6 working as switching elements of the first driving circuit 91 and a second control signal SW2 for driving six transistors Tr11 through Tr16 working as switching elements of the second driving circuit 92. The six transistors Tr1 through Tr6 in the first driving circuit 91 constitute a transistor inverter and are arranged in pairs to work as a source and a drain with respect to a pair of power lines P1 and P2. The three-phase coils (U,V,W) 36 of the clutch motor 30 are connected via the rotary transformer 38 to the respective contacts of the paired transistors. The power lines P1 and P2 are respectively connected to plus and minus terminals of the battery 94. The first control signal Sw1 output from the control CPU 90 successively controls the power-on time of the paired transistors Tr1 through Tr6. The electric current flowing through each coil 36 undergoes PWM (pulse width modulation) to give a quasi-sine wave, which enables the three-phase coils 36 to form a rotating magnetic field.

The six transistors Tr11 through Tr16 in the second driving circuit 92 also constitute a transistor inverter and are arranged in the same manner as the transistors Tr1 through Tr6 in the first driving circuit 91. The three-phase coils (U,V,W) 44 of the assist motor 40 are connected to the respective contacts of the paired transistors. The second control signal SW2 output from the control CPU 90 successively controls the power-on time of the paired transistors Tr11 through Tr16. The electric current flowing through each coil 44 undergoes PWM to give a quasi-sine wave, which enables the three-phase coils 44 to form a rotating magnetic field.

The power output apparatus 20 thus constructed works in accordance with the operation principles described below, especially with the principle of torque conversion. By way of example, it is assumed that the engine 50 driven by the EFIECU 70 rotates at a revolving speed Ne equal to a predetermined value N1. While the transistors Tr1 through Tr6 in the first driving circuit 91 are in OFF position, the controller 80 does not supply any current to the three-phase coils 36 of the clutch motor 30 via the rotary transformer 38. No supply of electric current causes the outer rotor 32 of the clutch motor 30 to be electromagnetically disconnected from the inner rotor 34. This results in racing the crankshaft 56 of the engine 50. Under the condition that all the transistors Tr1 through Tr6 are in OFF position, there is no regeneration of energy from the three-phase coils 36, and the engine 50 is kept at an idle.

As the control CPU 90 of the controller 80 outputs the first control signal SW1 to control on and off the transistors Tr1 through Tr6 in the first driving circuit 91, a constant electric current is flown through the three-phase coils 36 of the clutch motor 30, based on the difference between the revolving speed Ne of the crankshaft 56 of the engine 50 and a revolving speed Nd of the drive shaft 22 (that is, difference Kc (=Ne−Nd) between the revolving speed of the outer rotor 32 and that of the inner rotor 34 in the clutch motor 30). A certain slip accordingly exists between the outer rotor 32 and the inner rotor 34 connected with each other in the clutch motor 30. At this moments the inner rotor 34 rotates at the revolving speed Nd, which is lower than the revolving speed Ne of the crankshaft 56 of the engine 50. In this states the clutch motor 30 functions as a generator and carries out the regenerative operation to regenerate an electric current via the first driving circuit 91. In order to allow the assist motor 40 to consume energy identical with the electrical energy regenerated by the clutch motor 30, the control CPU 90 controls on and off the transistors Tr11 through Tr16 in the second driving circuit 92. The on-off control of the transistors Tr11 through Tr16 enables an electric current to flow through the three-phase coils 44 of the assist motor 40, and the assist motor 40 consequently carries out the power operation to produce a torque.

Referring to FIG. 4D while the crankshaft 56 of the engine 50 is driven at a revolving speed N1 and a torque T1, energy in a region G1 is regenerated as electric power by the clutch motor 30. The regenerated power is supplied to the assist motor 40 and converted to energy in a region G2, which enables the drive shaft 22 to rotate at a revolving speed N2 and a torque T2. The torque conversion is carried out in the manner discussed above, and the energy corresponding to the slip in the clutch motor 30 or the revolving speed difference Nc (=Ne−Nd) is consequently given as a torque to the drive shaft 22.

In another example, it is assumed that the engine 50 is driven at a revolving speed Ne=K2 and a torque Te=T2, whereas the drive shaft 22 is rotated at the revolving speed N1, which is greater than the revolving speed N2. In this state, the inner rotor 34 of the clutch motor 30 rotates relative to the outer rotor 32 in the direction of rotation of the drive shaft 22 at a revolving speed defined by the absolute value of the revolving speed difference Nc (=Ne−Nd). While functioning as a normal motor, the clutch motor 30 consumes electric power to apply the energy of rotational motion to the drive shaft 22. When the control CPU 90 of the controller 80 controls the second driving circuit 92 to enable the assist motor 40 to regenerate electrical energy a slip between the rotor 42 and the stator 43 of the assist motor 40 makes the regenerative current flow through the three-phase coils 44. In order to allow the clutch motor 30 to consume the energy regenerated by the assist motor 40, the control CPU 90 controls both the first driving circuit 91 and the second driving circuit 92. This enables the clutch motor 30 to be driven without using any electric power stored in the battery 94.

Referring back to FIG. 4, when the crankshaft 56 of the engine 50 is driven at the revolving speed N2 and the torque T2, energy in the sum of regions G2 and G3 is regenerated as electric power by the assist motor 40 and supplied to the clutch motor 30. Supply of the regenerated power enables the drive shaft 22 to rotate at the revolving speed N1 and the torque T1.

Other than the torque conversion and revolving speed conversion discussed above, the power output apparatus 20 of the embodiment can charge the battery 94 with an excess of electrical energy or discharge the battery 94 to supplement the electrical energy. This is implemented by controlling the mechanical energy output from the engine 50 (that is, the product of the torque Te and the revolving speed Ne), the electrical energy regenerated or consumed by the clutch motor 30, and the electrical energy regenerated or consumed by the assist motor 40. The output energy from the engine 50 can thus be transmitted as power to the drive shaft 22 at a higher efficiency.

Figure 5:
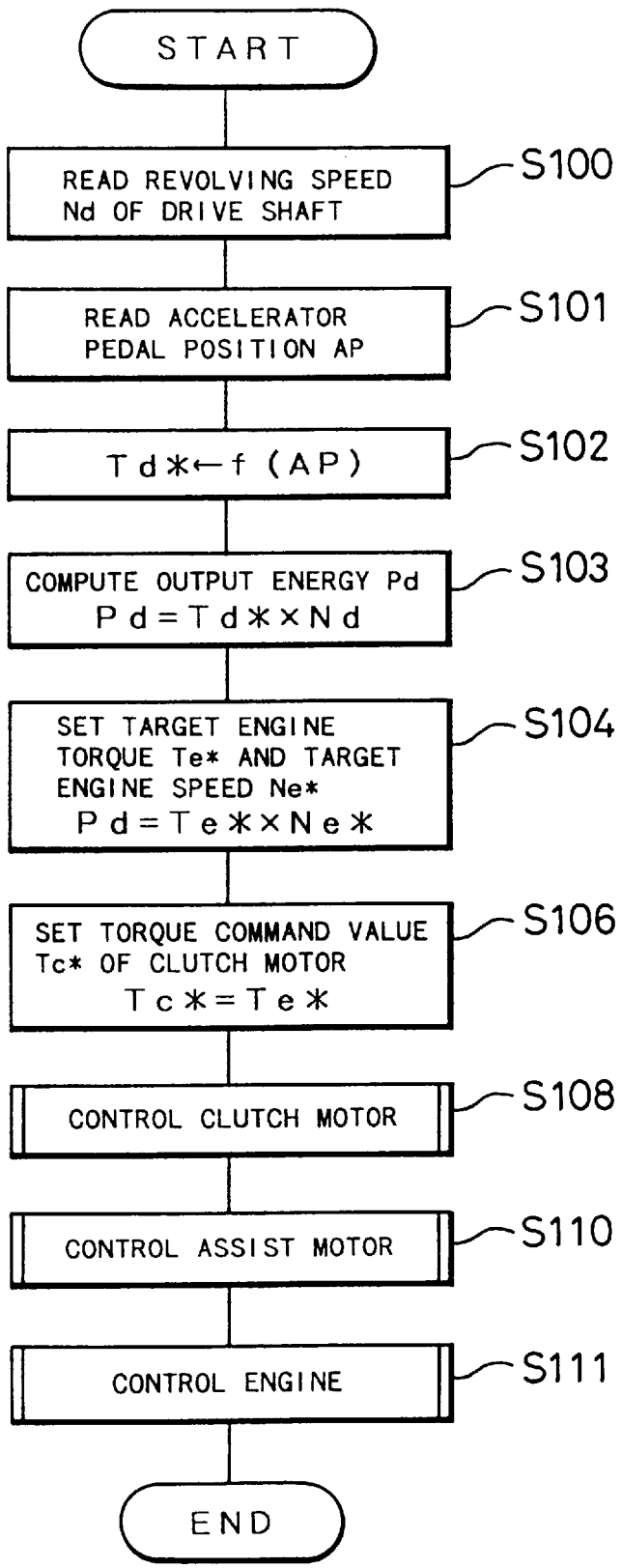
FIG. 5 is a flowchart showing a torque control routine executed by the controller 80 in the first embodiment.

The torque conversion discussed above is implemented according to the torque control process illustrated in the flowchart of FIG. 5. The following describes the essential torque control process executed in the power output apparatus 20 and then the similar process under the non-operating condition of the engine 50.

When the program enters the torque control routines the control CPU 90 of the controller 80 first receives data of revolving speed Nd of the drive shaft 22 at step S100. The revolving speed Nd of the drive shaft 22 can be computed from the rotational angle θd of the drive shaft 22 read from the resolver 48. At subsequent step S101, the control CPU 90 reads the accelerator pedal position AP output from the accelerator position sensor 65. The driver steps on the accelerator pedal 64 when feeling insufficiency of output torque. The value of the accelerator pedal position AP accordingly represents the desired output torque (that is, desired torque of the drive shaft 22) which the driver requires. The program then goes to step S102 at which the control CPU 90 computes a target output torque Td* (of the drive shaft 22) corresponding to the input accelerator pedal position AP. The target output torque Td* is also referred to as the output torque command value. Output torque command values Td* have been set previously for the respective accelerator pedal positions AP. In response to an input of the accelerator pedal position AP, the output torque command value Td* corresponding to the input accelerator pedal position AP is extracted from the preset output torque command values Td*.

At step S103, an amount of energy Pd to be output to the drive shaft 22 is calculated according to the expression Pd=Td*×Nd, that is, multiplying the extracted output torque command value Td* (of the drive shaft 22) by the input revolving speed Nd of the drive shaft 22. The program then proceeds to step S104 at which the control CPU 90 sets a target engine torque Te* and a target engine speed Ne* of the engine 50 based on the output energy Pd thus obtained. Here it is assumed that all the energy Pd to be output to the drive shaft 22 is supplied by the engine 50. Since the mechanical energy supplied from the engine 50 is equal to the product of the torque Te and the revolving speed Ne of the engine 50 the relationship between the output energy Pd, the target engine torque Te*, and the target engine speed Ne* can be expressed as Pd=Te*×Ne*. There are, however, numerous combinations of the target engine torque Te* and the target engine speed Ke* satisfying the above relationship. In this embodiments an optimal combination of the target engine torque Te* and the target engine speed Ne* is selected in order to realize operation of the engine 50 at the possible highest efficiency.

At subsequent step S106, the control CPU 90 determines a torque command value Tc* of the clutch motor 30 based on the target engine torque Te* set at step S104. In order to keep the revolving speed Ne of the engine 50 at a substantially constant levels it is required to make the torque of the clutch motor 30 balance the torque of the engine 50. The processing at step S106 accordingly sets the torque command value Tc* of the clutch motor 30 equal to the target engine torque Te*.

After setting the torque command value Tc* of the clutch motor 30 at step S106, the program proceeds to steps S108, S110, and S111 to control the clutch motor 30, the assist motor 40, and the engine 50, respectively. As a matter of convenience of illustrations the control operations of the clutch motor 30, the assist motor 40, and the engine 50 are shown as separate steps. In the actual procedures however, these control operations are carried out comprehensively. For examples the control CPU 90 simultaneously controls the clutch motor 30 and the assist motor 40 by interrupt processing, while transmitting an instruction to the EFIECU 70 through communication to control the engine 50 concurrently.

Figure 6:
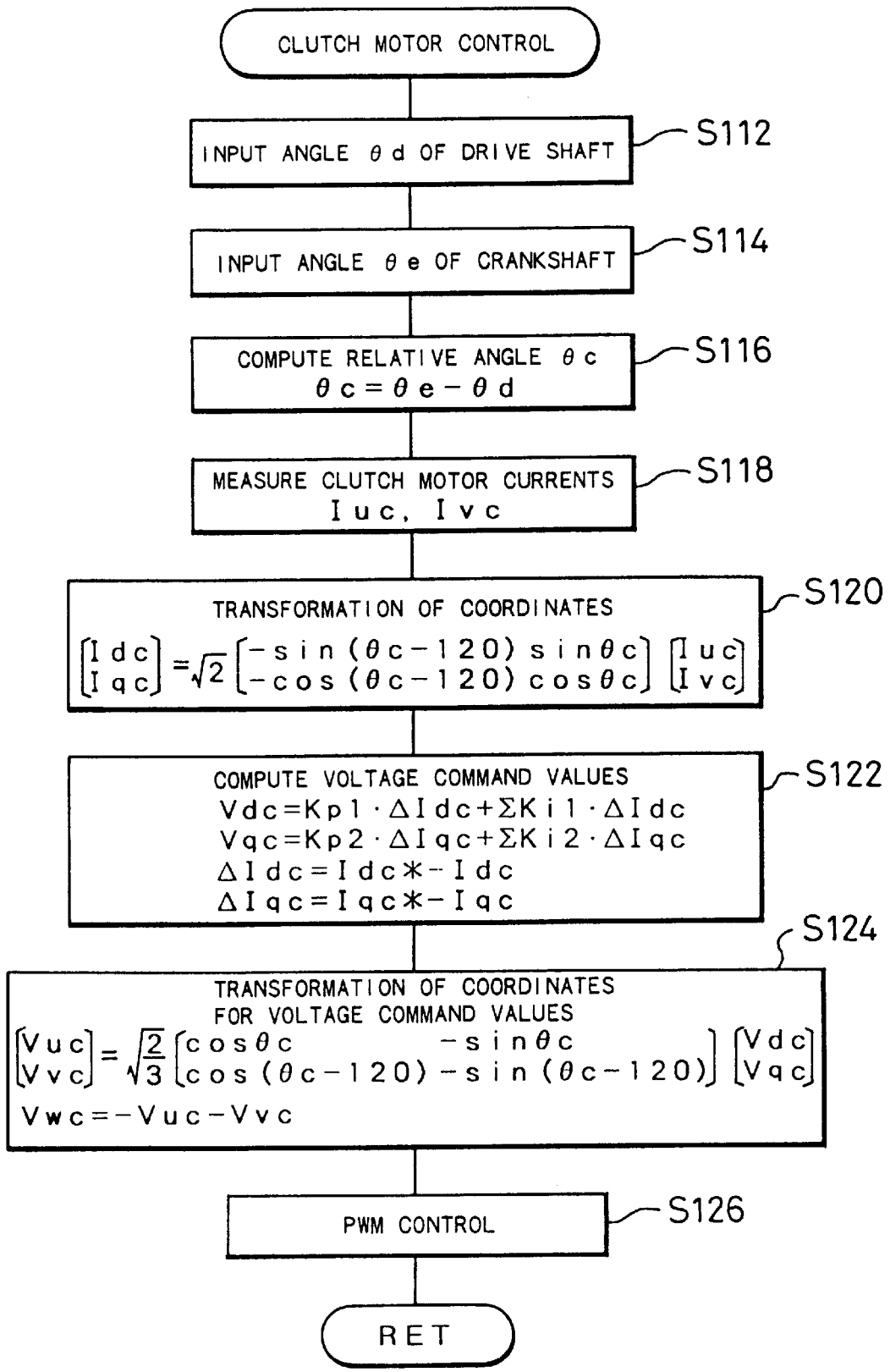
FIG. 6 is a flowchart showing details of the control process of the clutch motor 30 executed at step S108 in the flowchart of FIG. 5.

FIG. 6 is a flowchart showing details of the control process of the clutch motor 30 executed at step S108 in the flowchart of FIG. 5. When the program enters the clutch motor control routine, the control CPU 90 of the controller 80 first reads the rotational angle θd of the drive shaft 22 from the resolver 48 at step S112 and the rotational angle θe of the crankshaft 56 of the engine 50 from the resolver 39 at step S114. The control CPU 90 then computes a relative angle θc of the drive shaft 22 and the crankshaft 56 by the equation θc=θe−θd at step S116.

The program proceeds to step S118, at which the control CPU 90 receives inputs of clutch motor currents Iuc and Ivc, which respectively flow through the U phase and V phase of the three-phase coils 36 in the clutch motor 30, from the ammeters 95 and 96. Although the currents naturally flow through all the three phases U, V, and W, measurement is required only for the currents passing through the two phases since the sum of the currents is equal to zero. At subsequent step S120, the control CPU 90 executes transformation of coordinates (three-phase to two-phase transformation) using the values of currents flowing through the three phases obtained at step S118. The transformation of coordinates maps the values of currents flowing through the three phases to the values of currents passing through d and q axes of the permanent magnet-type synchronous motor and is executed according to Equation (1) given below:

$$\begin{bmatrix} Idc \\ Iqc \end{bmatrix} = \sqrt{2} \begin{bmatrix} -\sin(\theta c - 120) & \sin\theta c \\ -\cos(\theta c - 120) & \cos\theta c \end{bmatrix} \begin{bmatrix} Iuc \\ Ivc \end{bmatrix} \quad (1)$$

The transformation of coordinates is carried out because the currents flowing through the d and q axes are essential for the torque control in the permanent magnet-type synchronous motor. Alternatively, the torque control may be executed directly with the currents flowing through the three phases.

After the transformation to the currents of two axes, the control CPU 90 computes deviations of currents Idc and Iqc actually flowing through the d and q axes from current command values Idc* and Iqc* of the respective axes, which are calculated from the torque command value Tc* of the clutch motor 30, and determines voltage command values Vdc and Vqc for the d and q axes at step S122. In accordance with a concrete procedure, the control CPU 90 executes operations following Equations (2) and Equations (3) given below:

$$\Delta Idc = Idc^* - Idc$$

$$\Delta Iqc = Iqc^* - Iqc \quad (2)$$

$$Vdc = Kp1 \cdot \Delta Idc + \Sigma Ki1 \cdot \Delta Idc$$

$$Vqc = Kp2 \cdot \Delta Iqc + \Sigma Ki2 \cdot \Delta Iqc \quad (3)$$

wherein Kp1, Kp2, Ki1; and Ki2 represent coefficients, which are adjusted to be suited to the characteristics of the motor applied. The voltage command value Vdc (vqc) includes a part in proportion to the deviation ΔI from the current command value I* (first term in right side of Equation (3)) and a summation of historical data of the deviations ΔI for 'i' times (second term in right side).

The control CPU 90 then re-transforms the coordinates of the voltage command values thus obtained (two-phase to three-phase transformation) at step S124. This corresponds to an inverse of the transformation executed at step S120. The inverse transformation determines voltages Vuc, Vvc, and Vwc actually applied to the three-phase coils 36 as given below:

$$\begin{bmatrix} Vuc \\ Vvc \end{bmatrix} = \sqrt{\frac{2}{3}} \begin{bmatrix} \cos\theta c & -\sin\theta c \\ \cos(\theta c - 120) & -\sin(\theta c - 120) \end{bmatrix} \begin{bmatrix} Vdc \\ Vqc \end{bmatrix}$$

$$Vwc = -Vuc - Vvc \quad (4)$$

The actual voltage control is accomplished by on-off operation of the transistors Tr1 through Tr6 in the first driving circuit 91. At step S126, the on- and off-time of the transistors Tr1 through Tr6 in the first driving circuit 91 is PWM (pulse width modulation) controlled in order to attain the voltage command values Vuc, Vvc, and Vwc determined by Equation (4) above.

The torque command value Tc* is positive when a positive torque is applied to the drive shaft 22 in the direction of rotation of the crankshaft 56. By way of example, it is assumed that a positive value is set to the torque command value Tc*. When the revolving speed Ne of the engine 50 is greater than the revolving speed Nd of the drive shaft 22 on this assumption, that is, when the revolving speed difference Nc (=Ne−Nd) is positive, the clutch motor 30 is controlled to carry out the regenerative operation and produce a regenerative current corresponding to the revolving speed difference Nc. When the revolving speed Ne of the engine 50 is less than the revolving speed Nd of the drive shaft 22, that is, when the revolving speed difference Nc (=Ne−Nd) is negative, on the contrary the clutch motor 30 is controlled to carry out the power operation and rotate relative to the crankshaft 56 in the direction of rotation of the drive shaft 22 at a revolving speed defined by the absolute value of the revolving speed difference Nc. For the positive torque command value Tc*, both the regenerative operation and the power operation of the clutch motor 30 implement the identical switching control. In accordance with a concrete procedure, the transistors Tr1 through Tr6 of the first driving circuit 91 are controlled to enable a positive torque to be applied to the drive shaft 22 by the combination of the magnetic field generated by the permanent magnets 35 set on the outer rotor 32 with the rotating magnetic field generated by the currents flowing through the three-phase coils 36 on the inner rotor 34 in the clutch motor 30. The identical switching control is executed for both the regenerative operation and the power operation of the clutch motor 30 as long as the sign of the torque command value Tc* is not changed. The clutch motor control routine of FIG. 6 is thus applicable to both the regenerative operation and the power operation. Under the condition of braking the drive shaft 22 or moving the vehicle in reverses the torque command value Tc* has the negative sign. The clutch motor control routine of FIG. 6 is also applicable to the control procedure under such conditions, when the relative angle θc is varied in the reverse direction at step S126.

Figure 7:
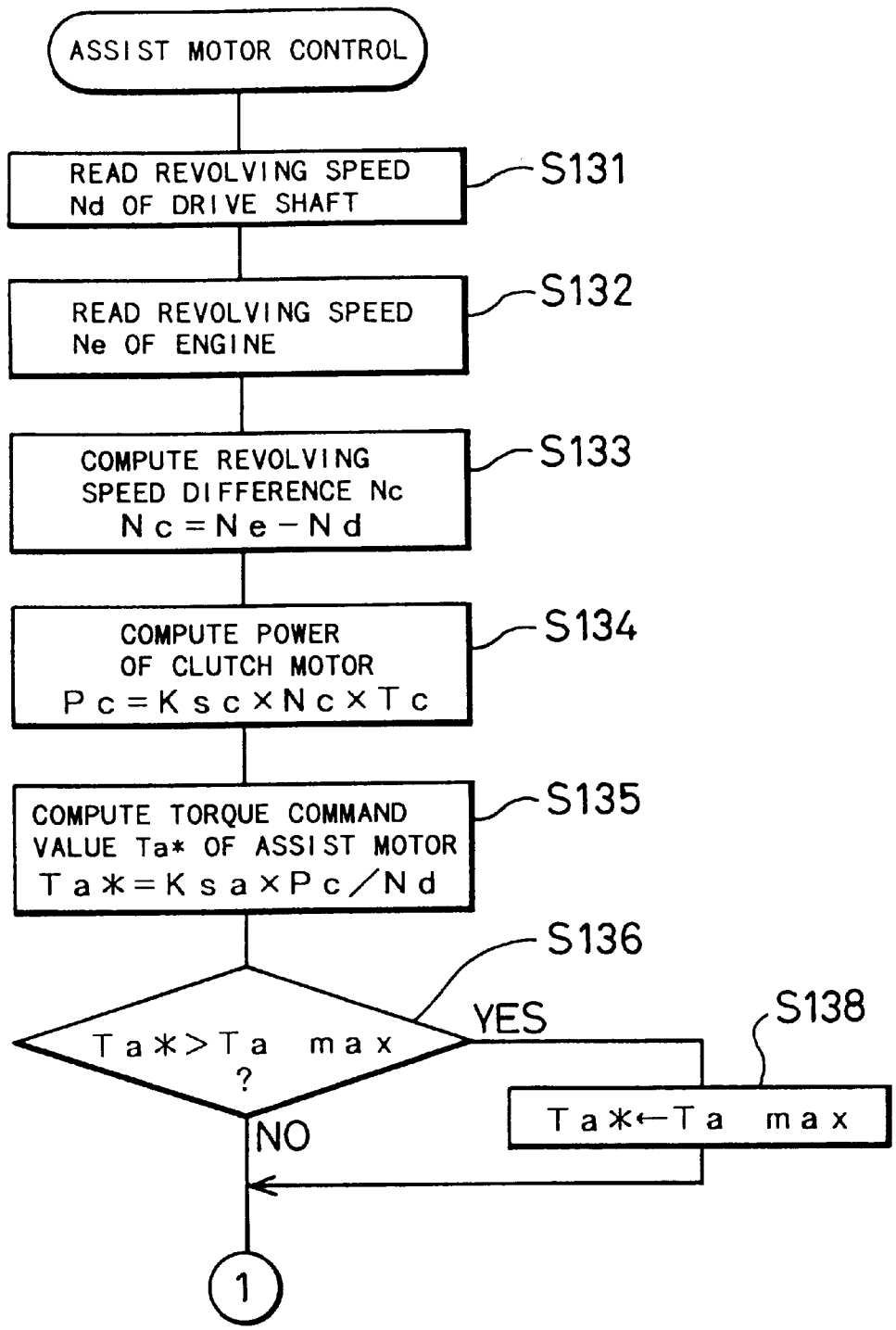
FIGS. 7 and 8 are flowcharts showing details of the control process of the assist motor 40 executed at step S110 in the flowchart of FIG. 5.
Figure 8:
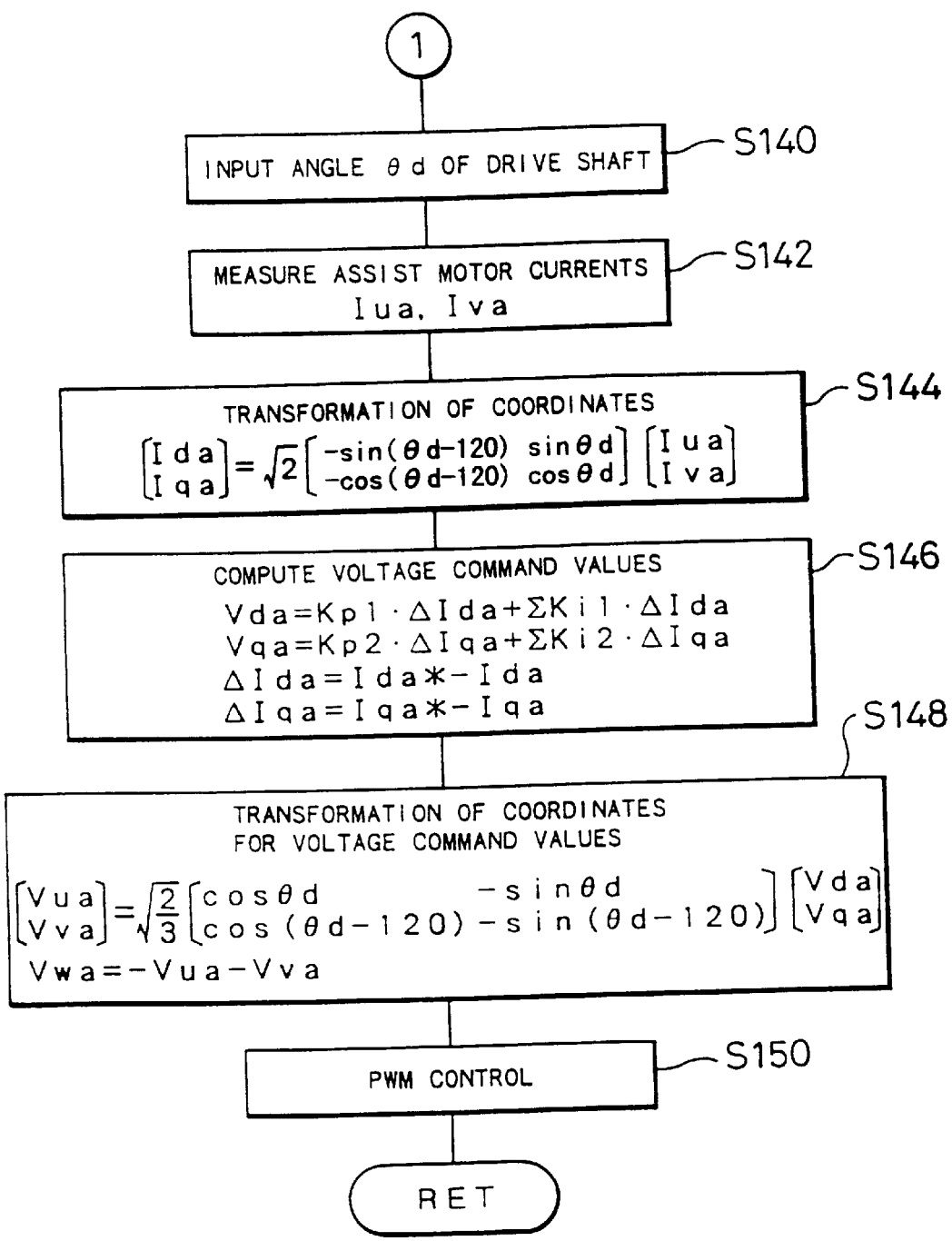

FIGS. 7 and 8 are flowcharts showing details of the control process of the assist motor 40 executed at step S110 in the flowchart of FIG. 5. Referring to the flowchart of FIG. 7, when the program enters the assist motor control routine, the control CPU 90 first receives data of revolving speed Nd of the drive shaft 22 at step S131. The revolving speed Nd of the drive shaft 22 is computed from the rotational angle θd of the drive shaft 22 read from the resolver 48. The control CPU 90 then receives data of revolving speed Ne of the engine 50 at step S132. The revolving speed Ne of the engine 50 may be computed from the rotational angle θe of the crankshaft 56 read from the resolver 39 or directly measured by the speed sensor 76 mounted on the distributor 60. In the latter cases the control CPU 90 receives data of revolving speed Ne of the engine 50 through communication with the EFIECU 70, which connects with the speed sensor 76.

A revolving speed difference Nc between the input revolving speed Nd of the drive shaft 22 and the input revolving speed Ne of the engine 50 is calculated according to the equation Nc=Ne−Nd at step S133. At subsequent step S134, electric power (energy) Pc regenerated or consumed by the clutch motor 30 is calculated according to Equation (5) given as:

$$Pc = Ksc \times Nc \times Tc \quad (5)$$

wherein Ksc represents the efficiency of regenerative operation or power operation in the clutch motor 30. The product Nc×Tc defines the energy corresponding to the region G1 in the graph of FIG. 4, wherein Nc and Tc respectively denote the revolving speed difference and the actual torque produced by the clutch motor 30.

At step S135, a torque command value Ta* of the assist motor 40 is determined by Equation (6) given as:

$$Ta^* = ksa \times Pc/Nd \qquad (6)$$

wherein ksa represents the efficiency of regenerative operation or power operation in the assist motor 40. The torque command value Ta* of the assist motor 40 thus obtained is compared with a maximum torque Tamax, which the assist motor 40 can potentially apply, at step S136. When the torque command value Ta* exceeds the maximum torque Tamax, the program proceeds to step S138 at which the torque command value Ta* is restricted to the maximum torque Tamax.

After the torque command value Ta* is set equal to the maximum torque Tamax at step S138 or after the torque command value Ta* is determined not to exceed the maximum torque Tamax at step S136, the program proceeds to step S140 in the flowchart of FIG. 8. The control CPU 90 reads the rotational angle θd of the drive shaft 22 from the resolver 48 at step S140, and receives data of assist motor currents Iua and Iva, which respectively flow through the U phase and V phase of the three-phase coils 44 in the assist motor 40, from the ammeters 97 and 98 at step S142. The control CPU 90 then executes transformation of coordinates for the currents of the three phases at step S144, computes voltage command values Vda and Vqa at step S146, and executes inverse transformation of coordinates for the voltage command values at step S148. At subsequent step S150, the control CPU 90 determines the on-and off-time of the transistors Tr11 through Tr16 in the second driving circuit 92 for PWM (pulse width modulation) control. The processing executed at steps S144 through S150 is similar to that executed at steps S120 through S126 of the clutch motor control routine shown in the flowchart of FIG. 6.

The assist motor 40 is subject to the power operation for the positive torque command value Ta* and the regenerative operation for the negative torque command value Ta*. Like the power operation and the regenerative operation of the clutch motor 30, the assist motor control routine of FIGS. 7 and 8 is applicable to both the power operation and the regenerative operation of the assist motor 40. This is also true when the drive shaft 22 rotates in reverse of the rotation of the crankshaft 56, that is, when the vehicle moves back. The torque command value Ta* of the assist motor 40 is positive when a positive torque is applied to the drive shaft 22 in the direction of rotation of the crankshaft 56.

The control of the engine 50 (step S111 in FIG. 5) is executed in the following manner. In order to attain stationary driving at the target engine torque Te* and the target engine speed Ne* (set at step S104 in FIG. 5), the control CPU 90 regulates the torque Te and the revolving speed Ne of the engine 50 to make them approach the target engine torque Te* and the target engine speed Ne*, respectively. In accordance with a concrete procedure, the control CPU 90 sends an instruction to the EFIECU 70 through communication to regulate the amount of fuel injection or the throttle valve position. Such regulation makes the torque Te and the revolving speed Ne of the engine 50 eventually approach the target engine torque Te* and the target engine speed Ne*.

This procedure enables the output (Te×Ne) of the engine 50 to undergo go the free torque conversion and be eventually transmitted to the drive shaft 22.

Charging control of the battery 94 starts when the residual capacity BRM of the battery 94 becomes equal to or less than a charge-initiating value BL, which has previously been set as a value requiring the charging process. Charging energy Pbi required for charging the battery 94 is added to the output energy Pd calculated at step S103 in the torque control routine of FIG. 5. The processing at step S104 and subsequent steps is executed with the newly set output energy Pd. On the other hands the charging energy Pbi is subtracted from the power Pc of the clutch motor 30 calculated at step S134 in the assist motor control routine of FIG. 7. The processing at step S135 and subsequent steps is executed with the newly set clutch motor power Pc. This procedure enables the battery 94 to be charged with the charging energy Pbi.

On the other hand, discharge control of the battery 94 starts when the residual capacity BRM of the battery 94 becomes equal to or more than a discharge-initiating value BH, which has been set as a value requiring the discharging process. A discharging energy Pbo required for discharging the battery 94 is subtracted from the output energy Pd calculated at step S103 in the torque control routine of FIG. 5. The processing at step S104 and subsequent steps is executed with the newly set output energy Pd. On the other hand, the discharging energy Pbo is added to the power Pc of the clutch motor 30 calculated at step S134 in the assist motor control routine of FIG. 7. The processing at step S135 and subsequent steps is executed with the newly set clutch motor power Pc. This procedure enables the battery 94 to be discharged with the discharging energy Pbo.

Figure 9:
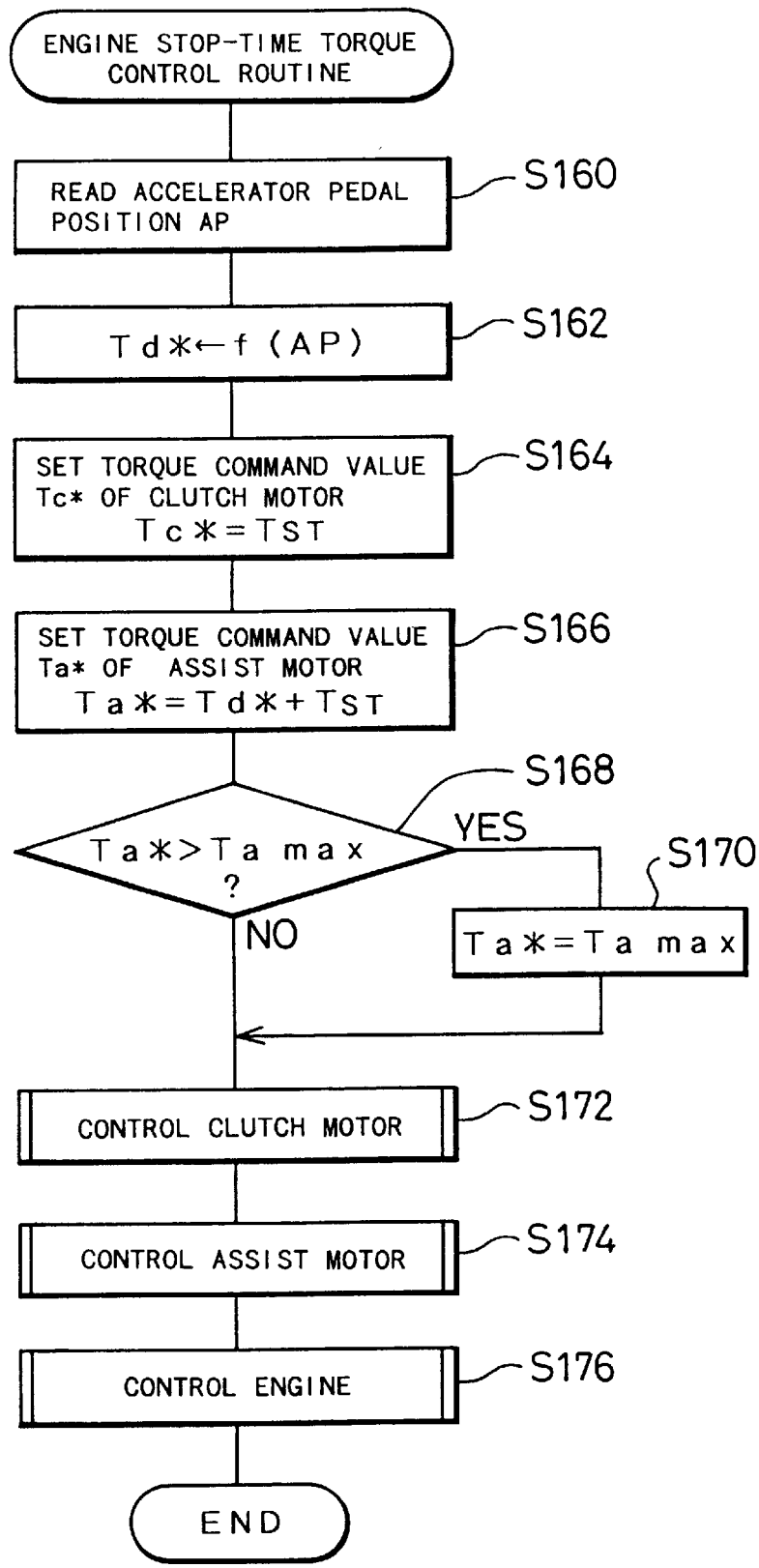
FIG. 9 is a flowchart showing an engine stop-time torque control routine executed by the controller 80 in the first embodiment.

In the power output apparatus of the embodiment, when the battery 94 has a sufficient residual capacity BRM, the vehicle may be driven only with the electric power supplied from the battery 94 while the engine 50 stops its operation. In this state, the engine stop-time torque control routine shown in the flowchart of FIG. 9 is executed to implement the torque control only with the electric power supplied from the battery 94.

When the program enters the engine stop-time torque control routine, the control CPU 90 of the controller 80 first receives data of accelerator pedal position AP from the accelerator position sensor 65 at step S160 and computes the output torque command value Td* corresponding to the input accelerator pedal position AP at step S162. The torque command value Tc* of the clutch motor 30 is set equal to a torque of rotational motion TST at step S164. The torque of rotational motion TST is a torque required for rotating the crankshaft 56 of the engine 50 at a predetermined revolving speed while the engine 50 stops its operation. Setting the torque command value Tc* of the clutch motor 30 equal to the torque of rotational motion TST enables the auxiliary machines to be driven even when the engine 50 is at a stop. The torque of rotational motion TST, which corresponds to the predetermined revolving speed of the crankshaft 56, is varied depending upon the characteristics of the engine 50 and the power required for the operation of the auxiliary machines, such as the cooling pump 104 and the P/S pump 106, connected to the crankshaft 56B directly or via the belt 102. In the embodiment, in order to minimize the energy consumed by the engine 50, the intake valve and the exhaust valve of the engine 50 are kept in closed position to stop the intake and exhaust during this torque control routine. This allows the energy in compression to be compensated with the energy in expansion.

At step S166, the torque command value Ta* of the assist motor 40 is calculated according to Equation (7) given as:

$$Ta^* = Td^* + TST \qquad (7)$$

The torque command value Ta* thus obtained is compared with the maximum torque Tamax, which the assist motor 40 can potentially apply, at step S168. When the torque command value Ta* exceeds the maximum torque Tamax, the program proceeds to step S170 at which the torque command value Ta* is limited to the maximum torque Tamax.

The control CPU 90 then controls the clutch motor 30 at step S172, the assist motor 40 at step S174, and the engine 50 at step S176 based on the torque command values set as discussed above. The concrete procedure of the clutch motor control (step S172) is identical with that described above according to the flowchart of FIG. 6. The torque of rotational motion TST set as the torque command value Tc* at step S164 in the engine stop-time torque control routine of FIG. 9 acts in reverse of the torque command value Tc* set in the process of essential torque control for transmitting the output of the engine 50 to the drive shaft 22 and thereby has the negative sign. This means that the voltage command values are calculated from the negative torque command value Tc* in the clutch motor control routine of FIG. 6.

The concrete procedure of the assist motor control (step S174) is similar to the processing of steps S140 through S150 in the assist motor control routine of FIGS. 7 and 8 executed in the process of essential torque control. This is because the torque command value Ta* of the assist motor 40 has already been set through the processing of steps S166 to S170 in the engine stop-time torque control routine of FIG. 9.

The engine control (step S176) maintains the non-operating condition of the engine 50 and keeps the intake valve and the exhaust valve of the engine 50 in closed position irrespective of the rotation of the crankshaft 56 as discussed above.

The power output apparatus 20 of the embodiment can rotate the crankshaft 56 even when the engine 50 is at a stop, and thereby drive the auxiliary machines connected with the crankshaft 56B, such as the cooling pump 104 and the P/S pump 106. The torque command value Ta* of the assist motor 40 is set equal to the sum of the output torque command value Td* and the torque of rotational motion TST, which is required to rotate the crankshaft 56 at the predetermined revolving speed. The driver accordingly does not feel the decrease in torque due to the rotation of the crankshaft 56, but obtains the torque corresponding to the step-on amount of the accelerator pedal 64. While the engine 50 stops its operation, the intake valve and the exhaust valve of the engine 50 are closed to minimize the energy consumption in the engine 50.

In the power output apparatus 20 of the embodiment, the torque command value Ta* of the assist motor 40 is set equal to the sum of the output torque command value Td* and the torque of rotational motion TST under the condition that the engine 50 is at a stop. In accordance with other applications however, the torque command value Ta* of the assist motor 40 may be set equal to the output torque command value Td* or the sum of the output torque command value Td* and another torque, which is different from the torque of rotational motion TST.

In the power output apparatus 20 of the embodiment, the intake valve and the exhaust valve of the engine 50 are closed during the torque control process under the engine-stop condition. In accordance with other applications, however, both the intake valve and the exhaust valve may be kept in open position or opened and closed according to the rotation of the crankshaft 56. In the former alternative structure, neither compression nor expansion is carried out and thus effectively reduces the pulsation of the torque.

In the structure of the power output apparatus 20 shown in FIG. 1, the clutch motor 30 and the assist motor 40 are separately attached to the different positions of the drive shaft 22. Like a modified power output apparatus 20A illustrated in FIG. 10 however, the clutch motor and the assist motor may integrally be joined with each other. A clutch motor 30A of the power output apparatus 20A includes an inner rotor 34A connecting with the crankshaft 56 and an outer rotor 32A linked with the drive shaft 22. Three-phase coils 36A are attached to the inner rotor 34A, and permanent magnets 35A are set on the outer rotor 32A in such a manner that the outer surface and the inner surface thereof have different magnetic poles. An assist motor 40A includes the outer rotor 32A of the clutch motor 30A and a stator 43 with three-phase coils 44 mounted thereon. In this structure, the outer rotor 32A of the clutch motor 30A also works as a rotor of the assist motor 40A. Since the three-phase coils 36A are mounted on the inner rotor 34A connecting with the crankshaft 56, a rotary transformer 38A for supplying electric power to the three-phase coils 36A of the clutch motor 30A is attached to the crankshaft 56.

In the power output apparatus 20A, the voltage applied to the three-phase coils 36A on the inner rotor 34A is controlled against the inner-surface magnetic pole of the permanent magnets 35A set on the outer rotor 32A. This allows the clutch motor 30A to work in the same manner as the clutch motor 30 of the power output apparatus 20 shown in FIG. 1. The voltage applied to the three-phase coils 44 on the stator 43 is controlled against the outer-surface magnetic pole of the permanent magnets 35A set on the outer rotor 32A. This allows the assist motor 40A to work in the same manner as the assist motor 40 of the power output apparatus 20. The torque control routine of FIG. 5 and the engine stop-time torque control routine of FIG. 9 are also applicable to the power output apparatus 20A shown in FIG. 10, which accordingly implements the same operations and exerts the same effects as those of the power output apparatus 20 shown in FIG. 1.

As discussed above, the outer rotor 32A functions concurrently as one of the rotors in the clutch motor 30A and as the rotor of the assist motor 40A, thereby effectively reducing the size and weight of the whole power output apparatus 20A.

Figure 11:
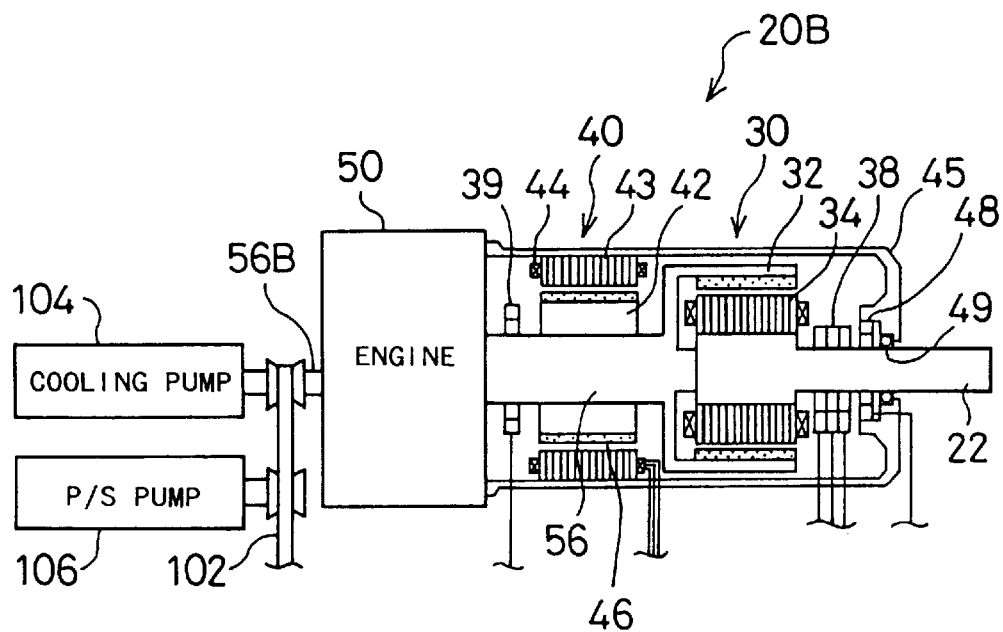
FIG. 11 schematically illustrates structure of another power output apparatus 20B as a second embodiment according to the present invention.

FIG. 11 schematically illustrates an essential part of another power output apparatus 20B as a second embodiment of the present invention. The power output apparatus 20B of FIG. 11 has a similar structure to that of the power output apparatus 20 of FIG. 1, except that the assist motor 40 is attached to the crankshaft 56 placed between the engine 50 and the clutch motor 30. In the power output apparatus 20B of the second embodiment, like numerals and symbols denote like elements as those of the power output apparatus 20 of FIG. 1. The symbols used in the description have like meanings unless otherwise specified.

The following describes the essential operation of the power output apparatus 20B shown in FIG. 11. By way of example, it is assumed that the engine 50 is driven with a torque Te and at a revolving speed Ne. When a torque Ta is added to the crankshaft 56 by the assist motor 40 linked with the crankshaft 56, the sum of the torques (Te+Ta) consequently acts on the crankshaft 56. When the clutch motor 30 is controlled to produce the torque Tc equal to the sum of the torques (Te+Ta), the torque Tc (=Te+Ta) is transmitted to the drive shaft 22.

When the revolving speed Ne of the engine 50 is greater than the revolving speed Nd of the drive shaft 22, the clutch motor 30 regenerates electric power based on the revolving speed difference Nc between the revolving speed Ne of the engine 50 and the revolving speed Nd of the drive shaft 22. The regenerated power is supplied to the assist motor 40 via the power lines P1 and P2 and the second driving circuit 92 to activate the assist motor 40. Provided that the torque Ta of the assist motor 40 is substantially equivalent to the electric power regenerated by the clutch motor 30, free torque conversion is allowed for the energy output from the engine 50 within a range holding the relationship of Equation (8) given below. Since the relationship of Equation (8) represents the ideal state with an efficiency of 100%, (Tc×Nd) is a little smaller than (Te×Ne) in the actual state.

$$Te \times Ne = Tc \times Nd \tag{8}$$

Figure 4:
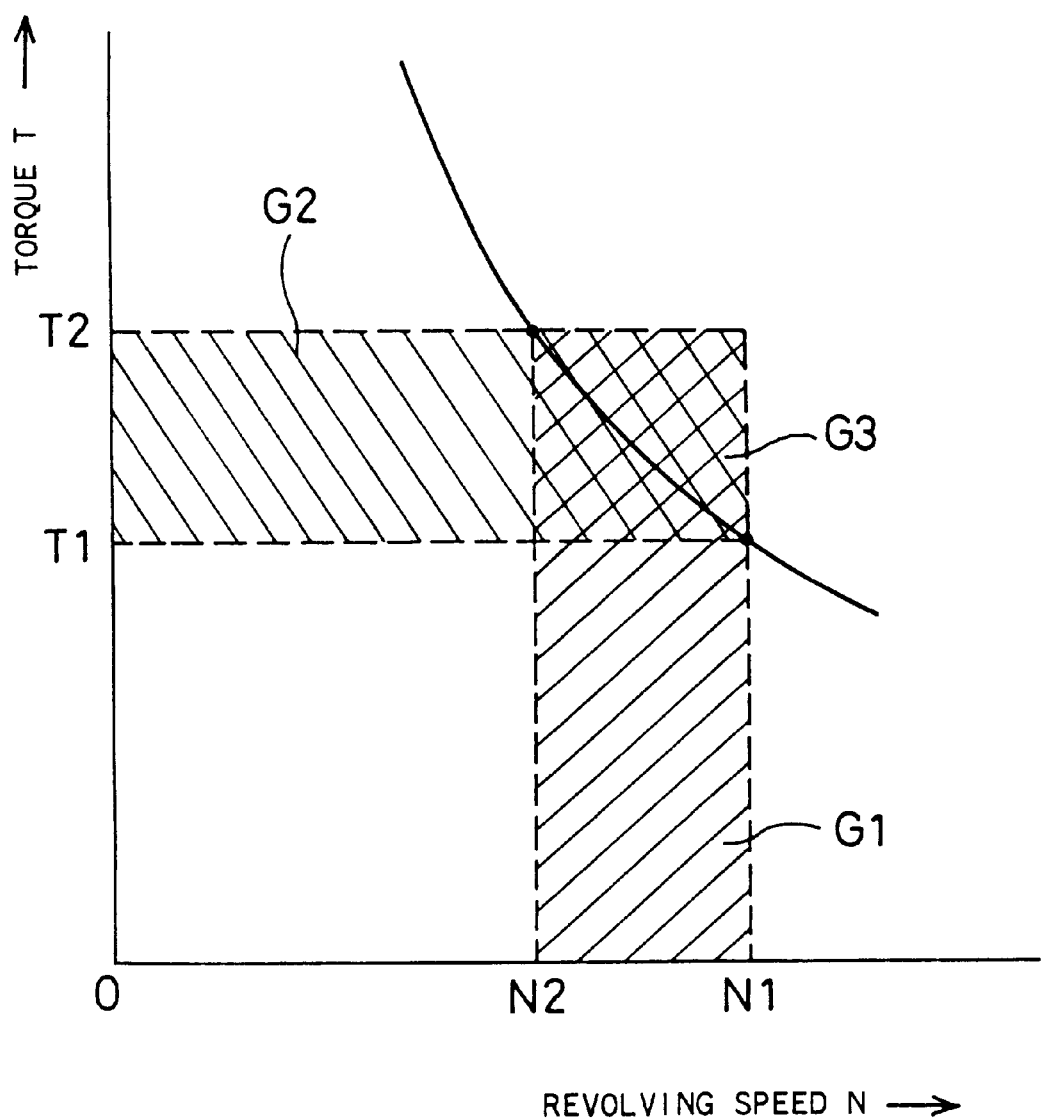
FIG. 4 is a graph showing the operation principle of the power output apparatus 20.

Referring to FIG. 4, under the condition that the crankshaft 56 rotates with the torque T1 and at the revolving speed N1 the energy corresponding to the sum of the regions G1+G3 is regenerated by the clutch motor 30 and supplied to the assist motor 40. The assist motor 40 converts the received energy in the sum of the regions G1+G3 to the energy corresponding to the sum of the regions G2+G3 and transmits the converted energy to the crankshaft 56.

When the revolving speed Ne of the engine 50 is smaller than the revolving speed Nd of the drive shaft 22, the clutch motor 30 works as a normal motor. In the clutch motor 30, the inner rotor 34 rotates relative to the outer rotor 32 in the direction of rotation of the drive shaft 22 at a revolving speed defined by the absolute value of the revolving speed difference Nc (=Ne−Nd). Provided that the torque Ta of the assist motor 40 is set to a negative value, which enables the assist motor 40 to regenerate electric power substantially equivalent to the electrical energy consumed by the clutch motor 30, free torque conversion is also allowed for the energy output from the engine 50 within the range holding the relationship of Equation (8) given above.

Referring to FIG. 4, under the condition that the crankshaft 56 rotates with the torque T2 and at the revolving speed N2, the energy corresponding to the region G2 is regenerated by the assist motor 40 and consumed by the clutch motor 30 as the energy corresponding to the region G1.

Figure 12:
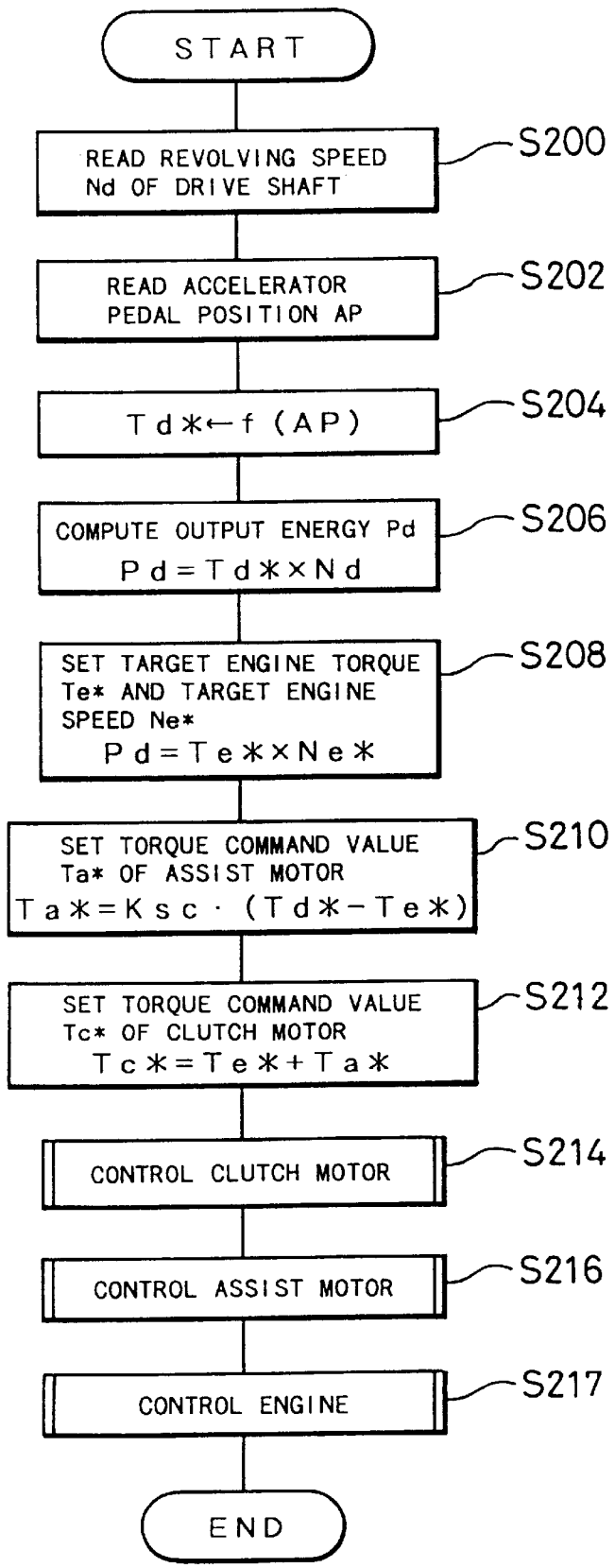
FIG. 12 is a flowchart showing a torque control routine executed by the controller 80 in the second embodiment.

The control procedure of the second embodiment discussed above follows the torque control routine shown in the flowchart of FIG. 12. When the program enters the torque control routine, the control CPU 90 of the controller 80 first executes the processing of steps S200 through S208, which is identical with that of steps S100 through S104 in the flowchart of FIG. 5. The control CPU 90 reads the revolving speed Nd of the drive shaft 22 at step S200 and the accelerator pedal position AP at step S202, and calculates the output torque command value Td* from the input accelerator pedal position AP at step S204. The control CPU 90 then computes the energy Pd to be output from the drive shaft 22 based on the calculated output torque command value Td* and the input revolving speed Nd of the drive shaft 22 at step S206, and sets the target engine torque Te* and the target engine speed Ne* of the engine 50 at step S208.

At subsequent step S210, the control CPU 90 computes the torque command value Ta* of the assist motor 40 according to Equation (9) given as:

$$Ta^* = Ksc \times (Td^* - Te^*) \tag{9}$$

At step S212, the torque command value Tc* of the clutch motor 30 is calculated from the torque command value Ta* of the assist motor 40 thus obtained according to Equation (10) expressed as:

$$Tc^* = Te^* + Ta^* \tag{10}$$

The control CPU 90 controls the clutch motor 30 at step S214, the assist motor 40 at step S216, and the engine 50 at step S217 based on the torque command values Ta* and Tc*, the target engine torque Te*, and the target engine speed Ne* thus obtained. The concrete procedure of the clutch motor control (step S214) is identical with that described above according to the flowchart of FIG. 6 whereas the concrete procedure of the engine control (step S217) is identical with that of the first embodiment discussed above. The assist motor control executed at step S216 essentially follows the processing of steps S140 through S150 in the assist motor control routine of FIG. 8, except that the rotational angle θe of the crankshaft 56 of the engine 50 measured with the resolver 39 is processed in place of the rotational angle θd of the drive shaft 22. This modification is ascribed to the position of the assist motor 40, which is attached to the crankshaft 56.

Figure 13:
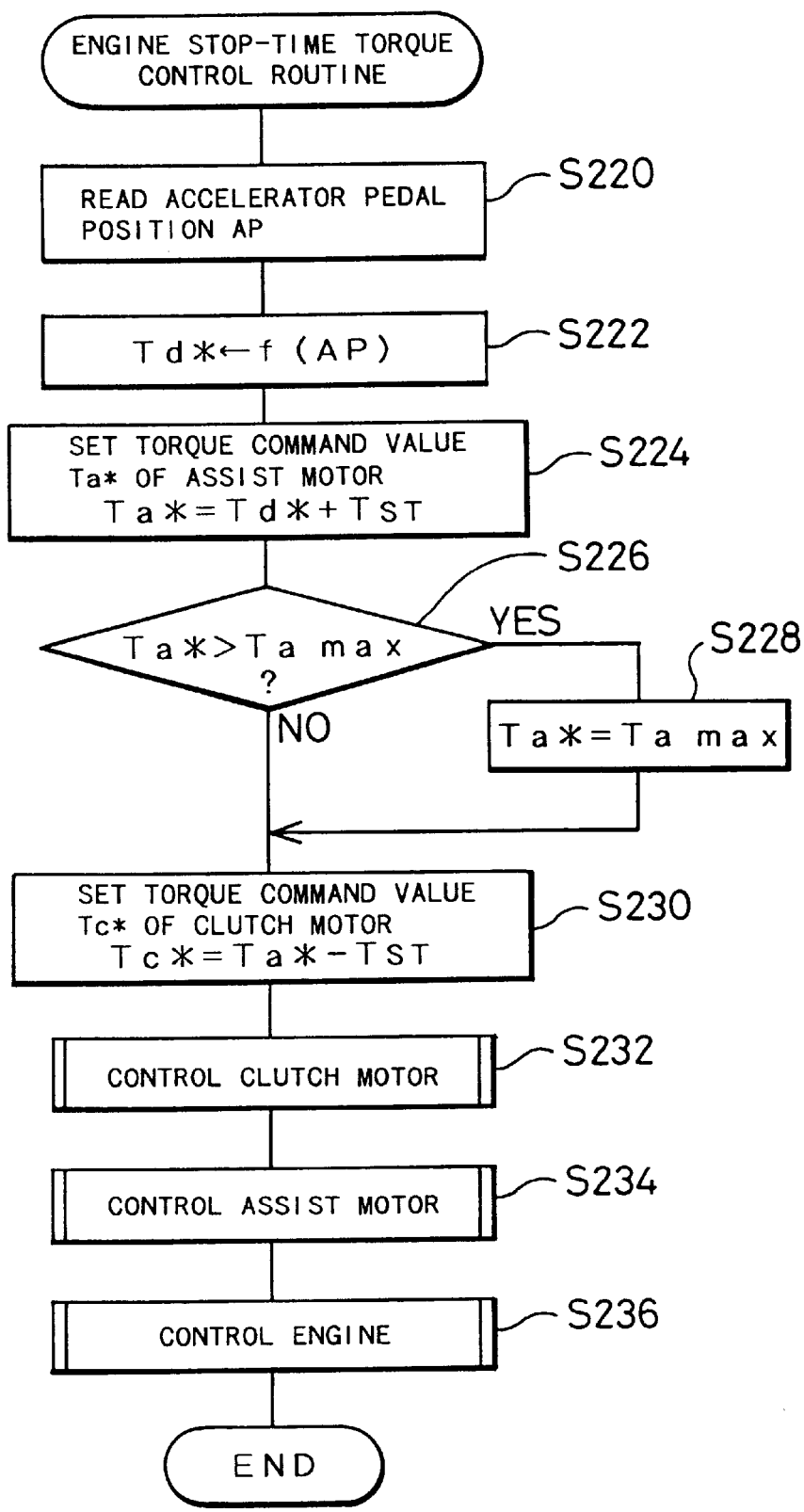
FIG. 13 is a flowchart showing an engine stop-time torque control routine executed by the controller 80 in the second embodiment.

Like the power output apparatus 20 of the first embodiment, the battery 94 can be charged and discharged according to the requirements in the power output apparatus 20B of the second embodiment. The vehicle may be driven only with the electric power stored in the battery 94 while the engine 50 stops its operation. FIG. 13 is a flowchart showing an engine stop-time torque control routine executed in the second embodiment.

When the program enters the engine stop-time torque control routine, the control CPU 90 of the controller 80 first receives data of accelerator pedal position AP from the accelerator position sensor 65 at step S220 and computes the output torque command value Td* corresponding to the input accelerator pedal position AP at step S222. The torque command value Ta* of the assist motor 40 is set equal to the sum of the output torque command value Td* and the torque of rotational motion TST at step S224. The torque command value Ta* thus obtained is compared with the maximum torque Tamax, which the assist motor 40 can potentially apply, at step S226. When the torque command value Ta* exceeds the maximum torque Tamax, the program proceeds to step S228 at which the torque command value Ta* is restricted to the maximum torque Tamax. The torque command value Tc* of the clutch motor 30 is then determined by subtracting the torque of rotational motion TST from the torque command value Ta* of the assist motor 40. When the torque command value Ta* of the assist motor 40 does not exceed the maximum torque Tamax at step S226, the torque command value Tc* of the clutch motor 30 is set equal to the output torque command value Td*.

The control CPU 90 then controls the clutch motor 30 at step S232 the assist motor 40 at step S234, and the engine 50 at step S236 based on the torque command values set as discussed above. The concrete procedures of the clutch motor control (step S232), the assist motor control (step S234) and the engine control (step S236) are identical with those of steps S172, S174 and S176 in the engine stop-time torque control routine of FIGS. 9, except that the rotational angle θe of the crankshaft 56 of the engine 50 is processed in the assist motor control in place of the rotational angle θd of the drive shaft 22.

In the structure of the second embodiments a torque difference corresponding to the torque of rotational motion TST is set between the torque command value Tc* of the clutch motor 30 and the torque command value Ta* of the assist motor 40. This increases the revolving speed of the crankshaft 56 of the engine 50 under the condition that the engine 50 stops its operation. As described previously the auxiliary machines, such as the cooling pump 104 and the P/S pump 106, are connected to the crankshaft 56B directly or via the belt 102. The crankshaft 56 is accordingly rotated at a revolving speed that makes the energy corresponding to the torque of rotational motion TST equal to the sum of the energy consumed by the piston-like movement of the engine 50 and that consumed by the operation of the auxiliary machines.

The power output apparatus 20B of the second embodiment can rotate the crankshaft 56 even when the engine 50 is at a stop, and thereby drive the auxiliary machines connected with the crankshaft 56B, such as the cooling pump 104 and the P/S pump 106. The torque command value Ta* of the assist motor 40 is set equal to the sum of the output torque command value Td* and the torque of rotational motion TST, which is required to rotate the crankshaft 56 at the predetermined revolving speed. The torque command value Tc* of the clutch motor 30 is generally set equal to the output torque command value Td*. The driver accordingly does not feel the decrease in torque due to the rotation of the crankshaft 56, but obtains the torque corresponding to the step-on amount of the accelerator pedal 64. While the engine 50 stops its operation, the intake valve and the exhaust valve of the engine 50 are closed to minimize the energy consumption in the engine 50.

Figure 14:
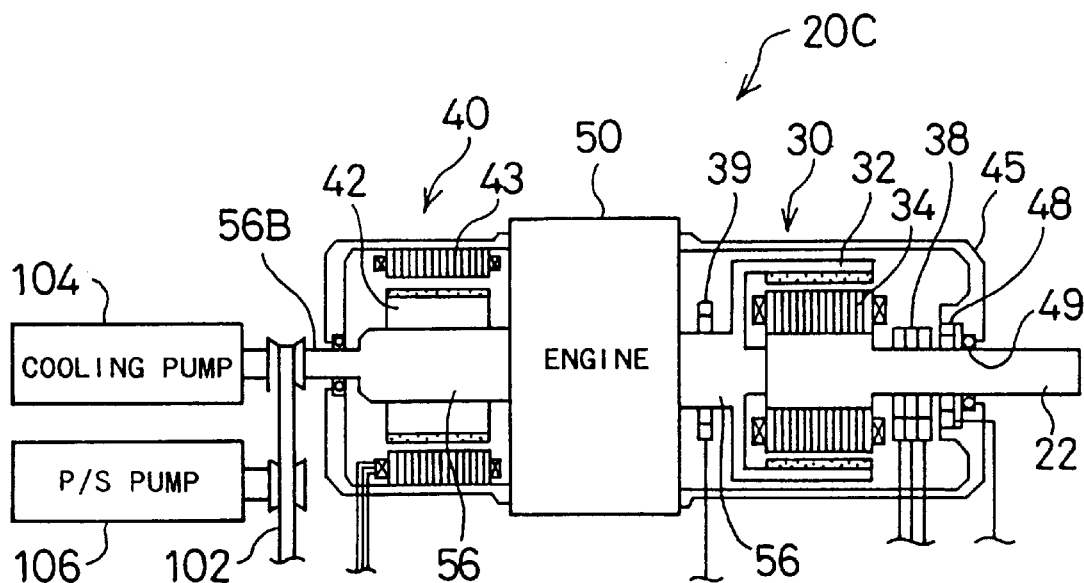
FIG. 14 schematically illustrates a power output apparatus 20C as a modification of the second embodiment.

In the power output apparatus 20B of FIG. 11 given as the second embodiment discussed above, the assist motor 40 is attached to the crankshaft 56 placed between the engine 50 and the clutch motor 30. Like another power output apparatus 20C illustrated in FIG. 14, however, the engine 50 may be interposed between the clutch motor 30 and the assist motor 40, both of which are linked with the crankshaft 56. In this structures the auxiliary machines, such as the cooling pump 104 and the P/S pump 106, are attached to the crankshaft 56B further extending from the crankshaft 56.

In the power output apparatus 20B of FIG. 11, the clutch motor 30 and the assist motor 40 are separately attached to the different positions of the crankshaft 56. Like a power output apparatus 20D shown in FIG. 15, however, the clutch motor and the assist motor may integrally be joined with each other. A clutch motor 30D of the power output apparatus 20D includes an outer rotor 32D connecting with the crankshaft 56 and an inner rotor 34 linked with the drive shaft 22. Three-phase coils 36 are attached to the inner rotor 34, and permanent magnets 35D are set on the outer rotor 32D in such a manner that the outer surface and the inner surface thereof have different magnetic poles. An assist motor 40D includes the outer rotor 32D of the clutch motor 30D and a stator 43 with three-phase coils 44 mounted thereon. In this structure, the outer rotor 32D of the clutch motor 30D also works as a rotor of the assist motor 40D.

In the power output apparatus 20D, the voltage applied to the three-phase coils 36 on the inner rotor 34 is controlled against the inner-surface magnetic pole of the permanent magnets 35D set on the outer rotor 32D. This allows the clutch motor 30D to work in the same manner as the clutch motor 30 of the power output apparatus 203 shown in FIG. 11. The voltage applied to the three-phase coils 44 on the stator 43 is controlled against the outer-surface magnetic pole of the permanent magnets 35D set on the outer rotor 32D. This allows the assist motor 40D to work in the same manner as the assist motor 40 of the power output apparatus 20B. The torque control routine of FIG. 12 and the engine stop-time torque control routine of FIG. 13 are also applicable to the power output apparatus 20D shown in FIG. 15, which accordingly implements the same operations and exerts the same effects as those of the power output apparatus 20B shown in FIG. 11.

Figure 10:
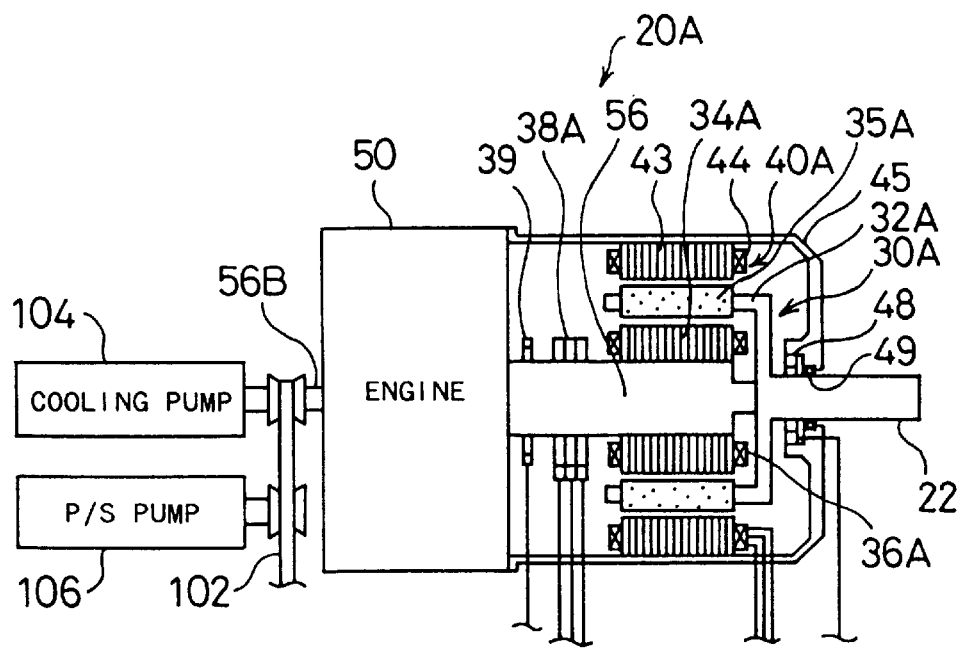
FIG. 10 schematically illustrates a power output apparatus 20A as a modification of the first embodiment.
Figure 15:
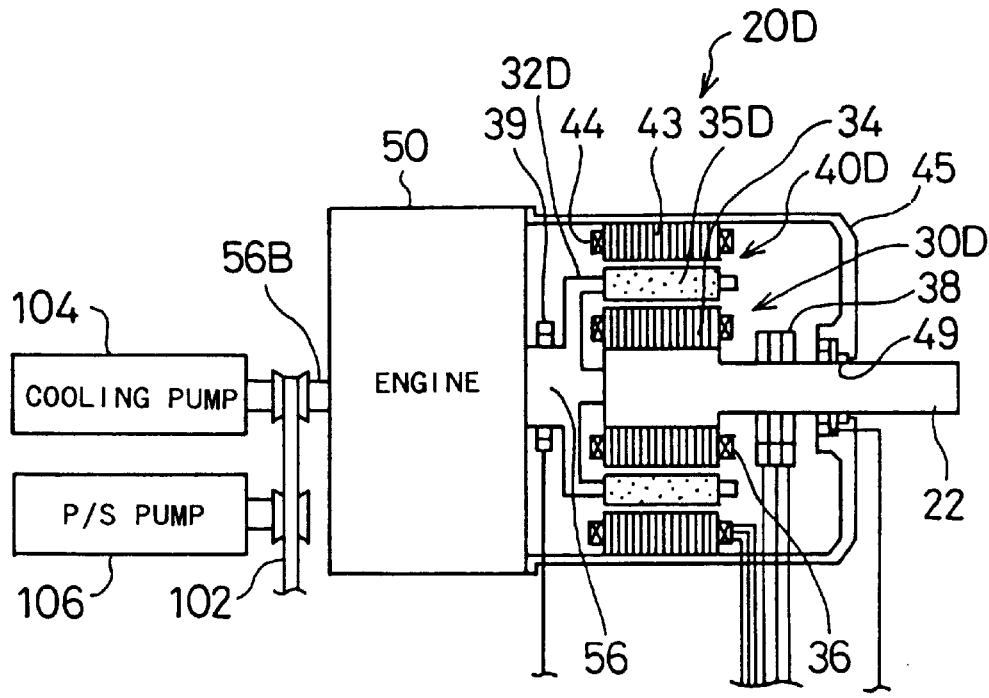
FIG. 15 schematically illustrates a power output apparatus 20D as another modification of the second embodiment.

Like the power output apparatus 20A shown in FIG. 10 in the power output apparatus 20D of FIG. 15, the outer rotor 32D functions concurrently as one of the rotors in the clutch motor 30D and as the rotor of the assist motor 40D, thereby effectively reducing the size and weight of the whole power output apparatus 20D.

There may be many other modifications, alternations, and changes without departing from the scope or spirit of essential characteristics of the invention. It is thus clearly understood that the above embodiments are only illustrative and not restrictive in any sense.

Figure 16:
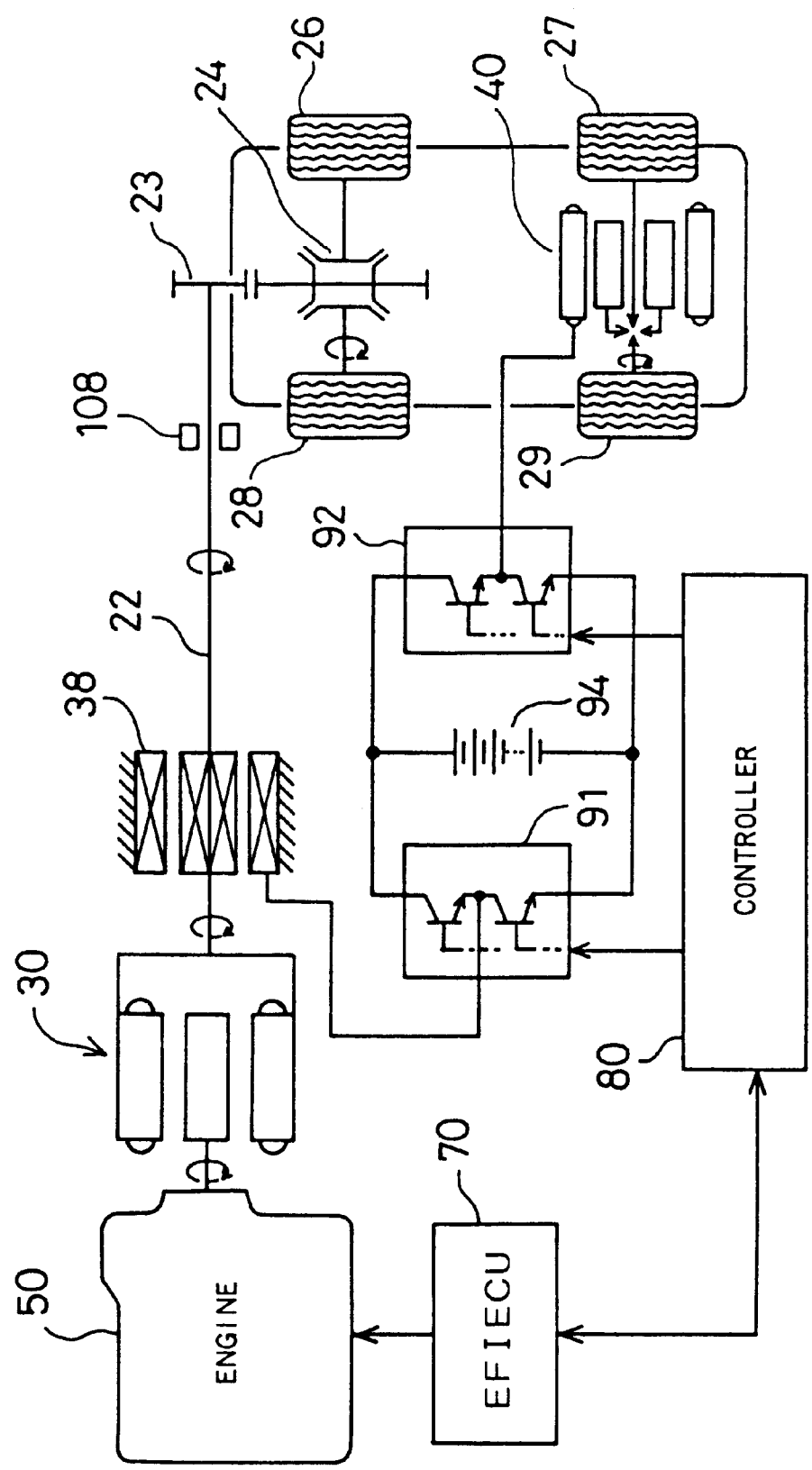
FIG. 16 shows application of the power plant 20 of FIG. 1 to a vehicle with a four-wheel drive.

For examples the power output apparatus 20 of FIG. 1 is applicable to the vehicle with a four-wheel drive (4wD) as shown in FIG. 16. In the structure of FIG. 16, the assist motor 40 which is mechanically linked with the drive shaft 22 in the structure of FIG. 1, is separated from the drive shaft 22 and independently disposed in a rear-wheel portion of the vehicle in order to drive rear driving wheels 27 and 29. One end of the drive shaft 22 is linked with a differential gear 24 via a gear 23 in order to drive front driving wheels 26 and 28. The control procedures of the first embodiment are also applicable to the structure of FIG. 16.

When the vehicle is driven only with the electric power supplied from the battery 94, the gear 23 is disconnected to cancel the coupling of the drive shaft 22 with the differential gear 24. In this state the front wheels 26 and 28 work as driven wheels while the rear driving wheels 27 and 29 are is driven by the assist motor 40. A locking mechanism 108 linked with the drive shaft 22 is activated to lock the drive shaft 22, whereas the crankshaft 56 is rotated with the torque command value Tc* of the clutch motor 30 set equal to the torque of rotational motion TST. Since the assist motor 40 is separated from the drive shaft 22, the torque command value Ta* of the assist motor 40 is not required to change with the torque of rotational motion TST applied from the clutch motor 30.

The gasoline engine driven by means of gasoline is used as the engine 50 in the above power output apparatuses. The principle of the invention is, however, applicable to other internal combustion engines and external combustion engines, such as Diesel engines, turbine engines, and jet engines.

Permanent magnet (PM)-type synchronous motors are used for the clutch motor 30 and the assist motor 40 in the power output apparatuses described above. Other motors such as variable reluctance (VR)-type synchronous motors, vernier motors, d c. motors, induction motors, superconducting motors, and stepping motors may be used for the regenerative operation and the power operation.

The rotary transformer 38 used as means for transmitting electric power to the clutch motor 30 may be replaced by a slip ring-brush contacts a slip ring-mercury contact, a semiconductor coupling of magnetic energy, or the like.

In the above power output apparatuses, transistor inverters are used for the first and the second driving circuits 91 and 92. Other examples applicable to the driving circuits 91 and 92 include IGBT (insulated gate bipolar mode transistor) inverters, thyristor inverters, voltage PWM (pulse width modulation) inverters, square-wave inverters (voltage inverters and current inverters), and resonance inverters.

The battery 94 may include Pb cells, NiNH cells, Li cells, or the like cells. A capacitor may be used in place of the battery 94.

Although the power output apparatus is mounted on the vehicle in the above embodiments, it may be mounted on other transportation means like ships and airplanes as well as a variety of industrial machines.

The scope and spirit of the present invention are limited only by the terms of the appended claims.

What is claimed is:

1. A power output apparatus for outputting power to a drive shaft, said power output apparatus comprising:

an engine having an output shaft;
a first motor comprising a first rotor connected with said output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;
a first motor-driving circuit for controlling a degree of electromagnetic connection of said first rotor and said second rotor in said first motor and regulating the rotation of said second rotor relative to said first rotor;
a second motor connected with said drive shaft;
a second motor-driving circuit for driving and controlling said second motor;
a storage battery being connected with said first motor-driving circuit and said second motor-driving circuit;
auxiliary machinery connected with said output shaft of said engine and driven by the power of said output shaft; and
an auxiliary machinery controller that controls said first motor-driving circuit and said second motor-driving circuit, said first motor-driving circuit enabling said first motor to apply a first torque to said output shaft of said engine with the electric power stored in said storage battery while said engine stops its operation, said first torque applied to said output shaft allowing said output shaft of said engine to rotate at a predetermined revolving speed to drive said auxiliary machinery said second motor-driving circuit enabling said second motor to apply a second torque to said drive shaft in order to reduce a variation in said second torque of said drive shaft relative to said first torque of said output shaft due to the rotation of said output shaft of said engine at the predetermined revolving speed, such that a decrease of said first torque is not sensed by a driver while simultaneously achieving the desired said second torque.

2. The power output apparatus in accordance with claim 1, wherein said second torque applied to said drive shaft is a sum of a third torque and a fourth torque, said third torque being applied to rotate said drive shaft and said fourth torque having a magnitude substantially equal to said first torque applied by said first motor to rotate said output shaft of said engine at said predetermined revolving speed but being opposite in direction to said first torque.

3. A power output apparatus for outputting power to a drive shaft, said power output apparatus comprising:
an engine having an output shaft;
a complex motor comprising a first rotor connected with said output shaft of said engine, a second rotor connected with said drive shaft being coaxial to and rotatable relative to said first rotor, and a stator for rotating said second rotor, said first rotor and said second rotor constituting a first motor, said second rotor and said stator constituting a second motor;
a first motor-driving circuit for driving and controlling said first motor in said complex motor;
a second motor-driving circuit for driving and controlling said second motor in said complex motor;
a storage battery being connected with said first motor-driving circuit and said second motor-driving circuit;
auxiliary machinery connected with said output shaft of said engine and driven by the power of said output shaft; and an auxiliary machinery controller that controls said first motor-driving circuit and said second motor-driving circuit said first motor-driving circuit enabling said first motor in said complex motor to apply a first torque to said output shaft of said engine with the electric power stored in said storage battery while said engine stops its operation, said first torque applied to said output shaft allowing said output shaft of said engine to rotate at a predetermined revolving speed to drive said auxiliary machinery said second motor-driving circuit enabling said second motor to apply a second torque to said drive shaft in order to reduce a variation in said second torque of said drive shaft relative to said first torque of said output shaft due to the rotation of said output shaft of said engine at the predetermined revolving speed such that a decrease of said first torque due to the rotation of said output shaft is not sensed by a driver while simultaneously achieving the desired said second torque.

4. The power output apparatus in accordance with claim 3, wherein said second torque applied to said drive shaft is a sum of a third torque and a fourth torque, said third torque being applied to rotate said drive shaft and said fourth torque having a magnitude substantially equal to said first torque applied by said first motor in said complex motor to rotate said output shaft of said engine at said predetermined revolving speed but being opposite in direction to said first torque.

5. A power output apparatus for outputting power to a drive shaft, said power output apparatus comprising:
an engine having an output shaft;
a first motor comprising a first rotor connected with said output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors;
a first motor-driving circuit for controlling a degree of electromagnetic connection of said first rotor with said second rotor in said first motor and regulating the rotation of said second rotor relative to said first rotor;
a second motor comprising a third rotor connected with said output shaft of said engine;
a second motor-driving circuit for driving and controlling said second motor;
a storage battery being connected with said first motor-driving circuit and said second motor-driving circuit;
auxiliary machinery connected with said output shaft of said engine and driven by the power of said output shaft;
an auxiliary machinery controller that controls said first motor-driving circuit and said second motor-driving circuit, said second motor-driving circuit enables said second motor to apply a first torque to said output shaft of said engine with the electric power stored in said storage battery while said engine stops its operation, said first torque applied to said output shaft allowing said output shaft of said engine to rotate at a predetermined revolving speed to drive said auxiliary machinery, said first motor-driving circuit enabling said first motor to apply a second torque to said drive shaft in order to reduce a variation in said second torque of said drive shaft relative to said first torque of said output shaft due to the rotation of said output shaft of said engine at the predetermined revolving speed, such that a decrease of said first torque due to the rotation of said output shaft is not sensed by a driver while simultaneously achieving the desired said second torque.

6. The power output apparatus in accordance with claim 5, wherein said first torque is greater than said second torque.

7. A power output apparatus for outputting power to a drive shaft, said power output apparatus comprising:

an engine having an output shaft;

a complex motor comprising a first rotor connected with said output shaft of said engine, a second rotor connected with said drive shaft being coaxial to and rotatable relative to said first rotor, and a stator for rotating said first rotor, said first rotor and said second rotor constituting a first motor, said first rotor and said stator constituting a second motor;

a first motor-driving circuit for driving and controlling said first motor in said complex motor;

a second motor-driving circuit for driving and controlling said second motor in said complex motor;

a storage battery being connected with said first motor-driving circuit and said second motor-driving circuit;

auxiliary machinery connected with said output shaft of said engine and driven by the power of said output shaft;

an auxiliary machinery controller that controls said first motor-driving circuit and said second motor-driving circuit, said second motor-driving circuit enables said second motor in said complex motor to apply a first torque to said output shaft of said engine with the electric power stored in said storage battery while said engine stops its operation, said first torque applied to said output shaft allowing said output shaft of said engine to rotate at a predetermined revolving speed to drive said auxiliary machinery, said first motor-driving circuit enabling said first motor to apple a second torque to said drive shaft in order to reduce a variation in said second torque of said drive shaft relative to said first torque of said output shaft due to the rotation of said output shaft of said engine at the predetermined revolving speed, such that a decrease of said first torque due to the rotation of said output shaft is not sensed by a driver while simultaneously achieving the desired said second torque.

8. A power output apparatus in accordance with claim 7, wherein said first torque is greater than said second torque.

9. A method of controlling a power output apparatus for outputting power to a drive shaft, said power output apparatus including an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors; a second motor connected with said drive shaft; a storage battery being connected with said first motor and said second motor; said method comprising the steps of:

(a) connecting auxiliary machinery with said output shaft of said engine and driving said auxiliary machinery by the power of said output shaft;

(b) controlling said first motor to enable said first motor to apply a first torque to said output shaft of said engine with the electric power stored in said storage battery while said engine stops its operation, said first torque being applied to said output shaft allowing said output shaft of said engine to rotate at a predetermined revolving speed to drive said auxiliary machinery;

(c) controlling said second motor to enable said second motor to apply a second torque to said drive shaft, and (d) reducing a variation in said second torque applied to said drive shaft relative to said first torque applied to said output shaft due to the operation of said first motor when said first motor rotates said output shaft of said engine such that a decrease of said first torque is not sensed by a driver while simultaneously achieving the desired said second torque.

10. The method in accordance with claim 9, wherein said second torque applied to said drive shaft is a sum of a third torque and a fourth torque, said third torque being applied to rotate said drive shaft and said fourth torque having a magnitude substantially equal to said first torque applied by said first motor to rotate said output shaft of said engine at the predetermined revolving speed but being opposite in direction to said first torque.

11. A method of controlling a power output apparatus for outputting power to a drive shaft, said power output apparatus including an engine having an output shaft; a first motor comprising a first rotor connected with said output shaft of said engine and a second rotor connected with said drive shaft, said second rotor being coaxial to and rotatable relative to said first rotor, said first and second rotors being electromagnetically connected with each other to transmit power between said output shaft of said engine and said drive shaft via the electromagnetic connection of said first and second rotors; a second motor connected with said output shaft of said engine; a storage battery being connected with said first motor and said second motor; said method comprising the steps of:

(a) connecting auxiliary machinery with said output shaft of said engine and driving said auxiliary machinery by the power of said output shaft;

(b) controlling said second motor to enable said second motor to apply a first torque to said output shaft of said engine with the electric power stored in said storage battery while said engine stops its operation, said first torque being applied to said output shaft allowing said output shaft of said engine to rotate at a predetermined revolving speed to drive said auxiliary machinery;

(c) controlling said first motor to enable said first motor to apply a second torque to said drive shaft; and (d) reducing a variation in said second torque applied to said drive shaft relative to said first torque applied to said output shaft due to the operation of said second motor when said second motor rotates said output shaft of said engine, such that a decrease of said first torque due to the rotation of said output shaft is not sensed by a driver while simultaneously achieving the desired said second torque.

12. The method in accordance with claim 11, wherein said first torque is greater than said second torque.

* * * * *